(12) United States Patent
Young

(10) Patent No.: US 8,007,387 B2
(45) Date of Patent: Aug. 30, 2011

(54) INVERTED TOOTH CHAIN SPROCKET WITH FREQUENCY MODULATED MESHING

(75) Inventor: James D. Young, Chesaning, MI (US)

(73) Assignee: Cloyes Gear and Products, Inc., Fort Smith, AR (US)

(*) Notice: Subject to any disclaimer, the term of this patent is extended or adjusted under 35 U.S.C. 154(b) by 1031 days.

(21) Appl. No.: 11/210,599

(22) Filed: Aug. 24, 2005

(65) Prior Publication Data

US 2006/0058141 A1    Mar. 16, 2006

Related U.S. Application Data

(60) Provisional application No. 60/604,608, filed on Aug. 26, 2004, provisional application No. 60/626,276, filed on Nov. 9, 2004.

(51) Int. Cl.
*F16H 7/06* (2006.01)
(52) U.S. Cl. .......................................... 474/157; 474/156
(58) Field of Classification Search .................. 474/155, 474/212, 213, 156, 157
See application file for complete search history.

(56) References Cited

U.S. PATENT DOCUMENTS

| | | | |
|---|---|---|---|
| 3,377,875 A | 4/1968 | Sand | |
| 3,495,468 A | 2/1970 | Griffel | |
| 4,168,634 A | 9/1979 | Griffel | |
| 4,509,323 A | 4/1985 | Ledvina et al. | |
| 4,758,209 A | 7/1988 | Ledvina | |
| 4,832,668 A | 5/1989 | Ledvina et al. | |
| 4,915,676 A | 4/1990 | Komeya | |
| 5,154,674 A | 10/1992 | Avramidis et al. | |
| 5,236,400 A | 8/1993 | Tsuyama | |
| 5,267,910 A | 12/1993 | Maruyama et al. | |
| 5,453,059 A | 9/1995 | Avranudis et al. | |
| 5,628,702 A | 5/1997 | Kotera | |
| 5,921,879 A | 7/1999 | Young | |
| 5,976,045 A | 11/1999 | Young | |
| 5,997,424 A | 12/1999 | Young | |
| 6,090,003 A | 7/2000 | Young | |
| 6,179,741 B1 | 1/2001 | Young | |
| 6,325,734 B1 | 12/2001 | Young | |
| 6,325,735 B1 | 12/2001 | Kanehira et al. | |
| 6,371,875 B2 | 4/2002 | Young | |
| 6,413,180 B1 | 7/2002 | Kanehira et al. | |
| 6,416,436 B1 | 7/2002 | Kanehira et al. | |
| 6,461,263 B2 | 10/2002 | Suzuki et al. | |

(Continued)

FOREIGN PATENT DOCUMENTS

EP     0 092 900     11/1983

(Continued)

*Primary Examiner* — Robert Siconolfi
*Assistant Examiner* — Stephen Bowes
(74) *Attorney, Agent, or Firm* — Fay Sharpe LLP

(57) ABSTRACT

A sprocket includes teeth defined relative to respective tooth centers spaced evenly about an axis of rotation. An inverted tooth chain includes rows of links each structured for inside flank engagement with the sprocket, with leading inside flanks of each row projecting outwardly relative to the trailing outside flanks of a preceding row. The leading inside flanks of each row are positioned to make initial meshing contact with an engaging flank of one of the sprocket teeth. At least some of the teeth are standard teeth and other ones of the teeth are flank-relieved teeth. The engaging flanks of the flank-relieved teeth are negatively offset as compared to the engaging flanks of the standard teeth measured relative to their respective tooth centers. The root surfaces leading the flank-relieved teeth are raised relative to the root surfaces leading the standard teeth.

6 Claims, 25 Drawing Sheets

U.S. PATENT DOCUMENTS

| | | |
|---|---|---|
| 6,533,107 B2 | 3/2003 | Suzuki et al. |
| 6,533,691 B2 * | 3/2003 | Horie et al. .................. 474/213 |
| 6,663,522 B2 | 12/2003 | Horie |
| 2002/0058561 A1 | 5/2002 | Kanehira et al. |
| 2004/0166978 A1 | 8/2004 | Matsuda et al. |

FOREIGN PATENT DOCUMENTS

| | | |
|---|---|---|
| EP | 1 426 655 A2 | 6/2004 |
| JP | 55-024203 | 2/1980 |
| JP | 55024203 A * | 2/1980 |
| JP | 56-150655 | 11/1981 |
| JP | 56150655 A * | 11/1981 |
| JP | S58-196347 | 11/1983 |
| JP | H8-184348 | 7/1996 |
| JP | 2001-355684 | 12/2001 |

* cited by examiner

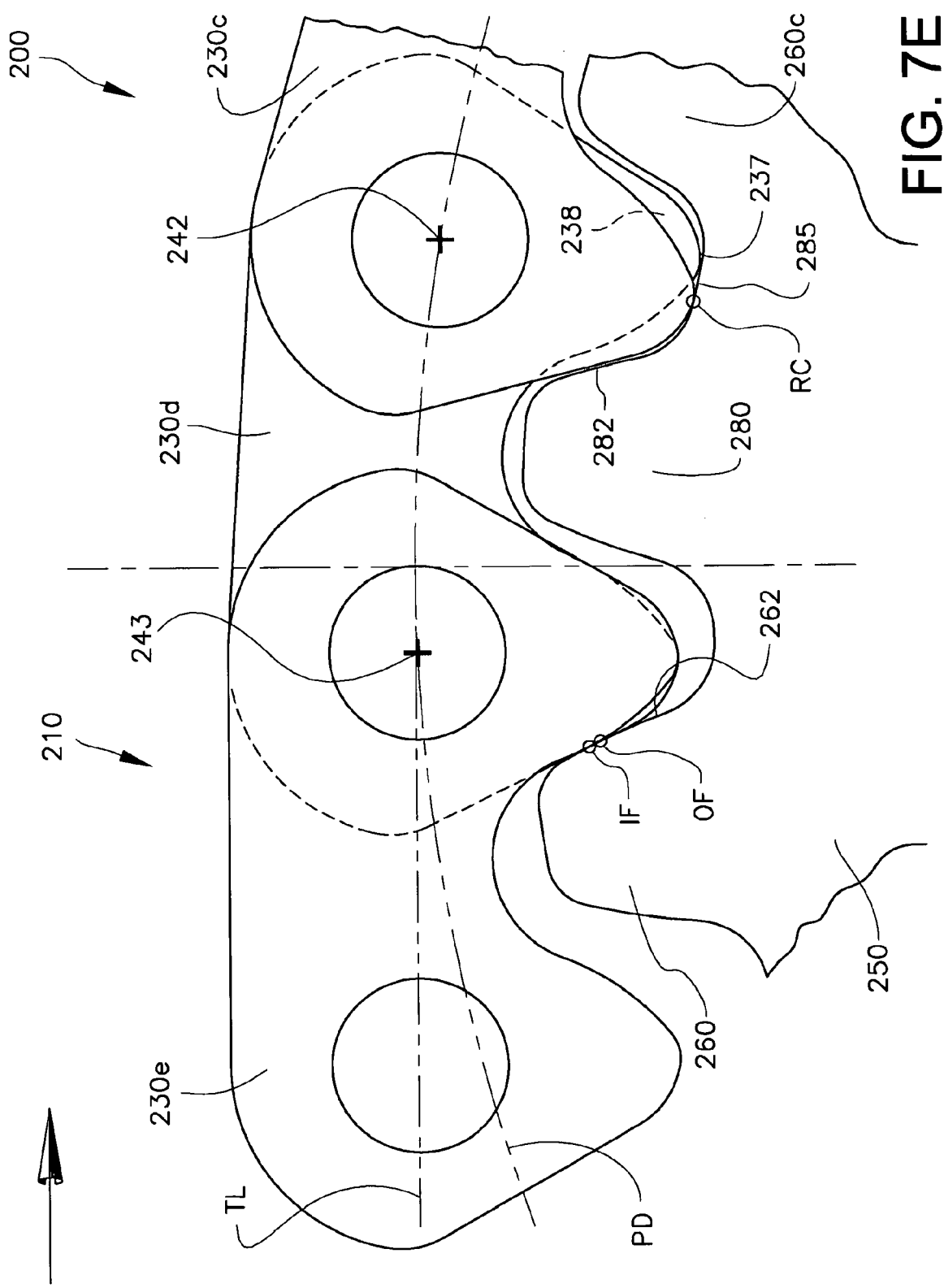

MESHING PATTERN & IC ANGLES
7.7 mm PITCH 30-TOOTH SPROCKET
CHAIN PITCH Pc = THEORETICAL (MIN.) PITCH

| TOOTH NO. | IC OCCURS LATER  11.75 | θ°  13.00 |
|---|---|---|
| 1 |  | 260 |
| 2 | 280 |  |
| 3 |  | 260 |
| 4 | 280 |  |
| 5 |  | 260 |
| 6 |  | 260 |
| 7 |  | 260 |
| 8 | 280 |  |
| 9 |  | 260 |
| 10 |  | 260 |
| 11 | 280 |  |
| 12 |  | 260 |
| 13 | 280 |  |
| 14 |  | 260 |
| 15 |  | 260 |
| 16 |  | 260 |
| 17 |  | 260 |
| 18 | 280 |  |
| 19 |  | 260 |
| 20 | 280 |  |
| 21 |  | 260 |
| 22 | 280 |  |
| 23 |  | 260 |
| 24 |  | 260 |
| 25 | 280 |  |
| 26 |  | 260 |
| 27 |  | 260 |
| 28 |  | 260 |
| 29 | 280 |  |
| 30 |  | 260 |
| Δ° | 1.25 | 0.00 |

FIG. 8B

MESHING PATTERN & IC ANGLES
7.7 mm PITCH 30-TOOTH SPROCKET

CHAIN PITCH Pc' = MAX. AS-MANUFACTURED PITCH

| TOOTH NO. | IC OCCURS LATER 11.75 | θ° 13.00 | IC OCCURS SOONER 13.13 |
|---|---|---|---|
| 1  |      | 260  |      |
| 2  | 280  |      |      |
| 3  |      |      | 260  |
| 4  | 280  |      |      |
| 5  |      |      | 260  |
| 6  |      | 260  |      |
| 7  |      | 260  |      |
| 8  | 280  |      |      |
| 9  |      |      | 260  |
| 10 |      | 260  |      |
| 11 | 280  |      |      |
| 12 |      |      | 260  |
| 13 | 280  |      |      |
| 14 |      |      | 260  |
| 15 |      | 260  |      |
| 16 |      | 260  |      |
| 17 |      | 260  |      |
| 18 | 280  |      |      |
| 19 |      |      | 260  |
| 20 | 280  |      |      |
| 21 |      |      | 260  |
| 22 | 280  |      |      |
| 23 |      |      | 260  |
| 24 |      | 260  |      |
| 25 | 280  |      |      |
| 26 |      |      | 260  |
| 27 |      | 260  |      |
| 28 |      | 260  |      |
| 29 | 280  |      |      |
| 30 |      |      | 260  |
| Δ° | 1.25 | 0.00 | -0.13 |

FIG. 8C

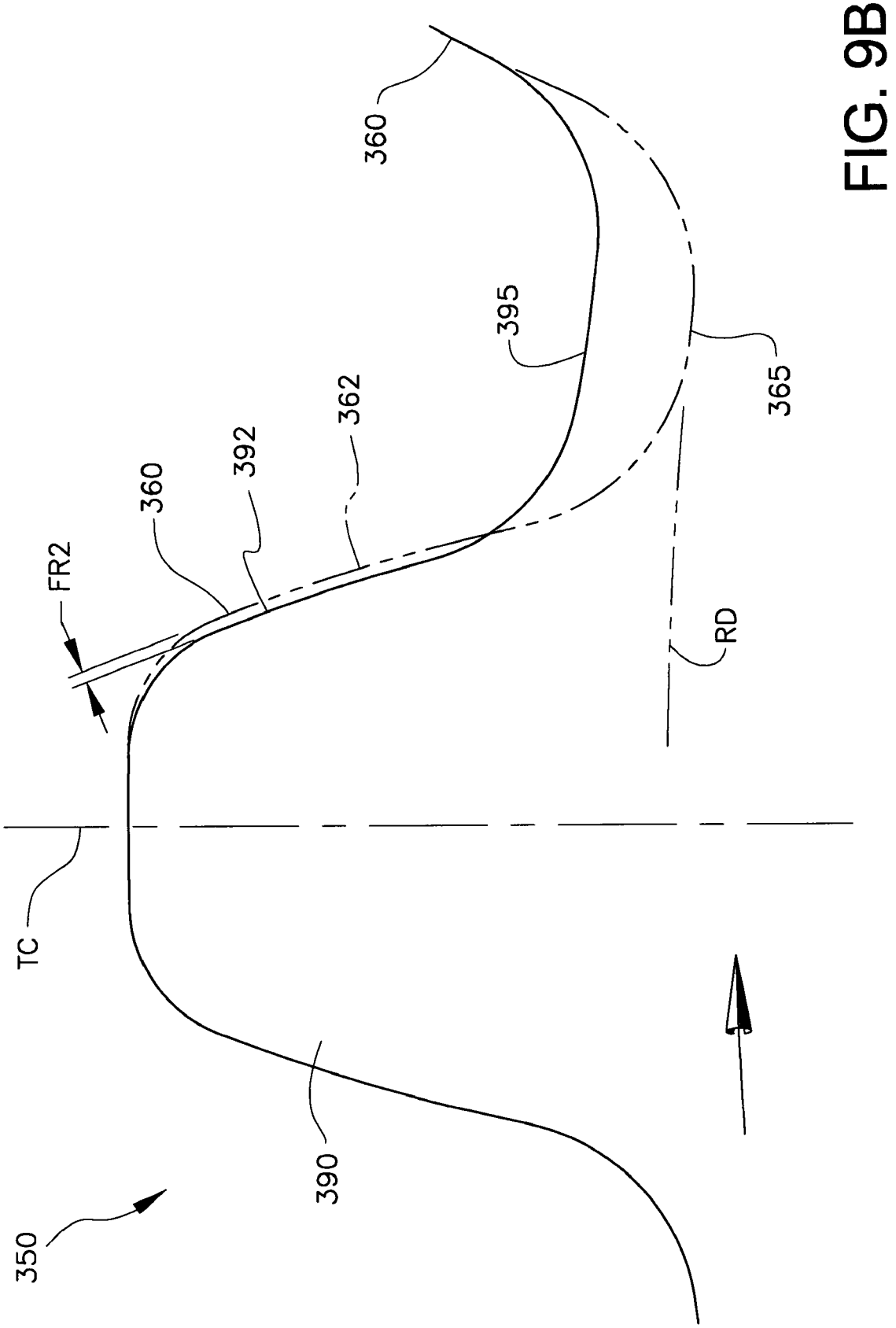

MESHING PATTERN & IC ANGLES
7.7 mm PITCH 30-TOOTH SPROCKET

CHAIN PITCH Pc' = MAX. AS-MANUFACTURED PITCH

| TOOTH NO. | IC OCCURS LATER | | $\theta°$ | IC OCCURS SOONER |
|---|---|---|---|---|
| | 11.10 | 11.75 | 13.00 | 13.13 |
| 1 | | | 360 | |
| 2 | 390 | | | |
| 3 | | | | 360 |
| 4 | | 380 | | |
| 5 | | | | 360 |
| 6 | | | 360 | |
| 7 | | | 360 | |
| 8 | 390 | | | |
| 9 | | | | 360 |
| 10 | | | 360 | |
| 11 | | 380 | | |
| 12 | | | | 360 |
| 13 | | 380 | | |
| 14 | | | | 360 |
| 15 | | | 360 | |
| 16 | | | 360 | |
| 17 | | | 360 | |
| 18 | 390 | | | |
| 19 | | | | 360 |
| 20 | | 380 | | |
| 21 | | | | 360 |
| 22 | 390 | | | |
| 23 | | | | 360 |
| 24 | | | 360 | |
| 25 | | 380 | | |
| 26 | | | | 360 |
| 27 | | | 360 | |
| 28 | | | 360 | |
| 29 | 390 | | | |
| 30 | | | | 360 |
| Δ° | 1.90 | 1.25 | 0.00 | -0.13 |

FIG. 11

INVERTED TOOTH CHAIN SPROCKET WITH FREQUENCY MODULATED MESHING

CROSS-REFERENCE TO RELATED APPLICATIONS

This application claims priority from and benefit of the filing date of: (i) U.S. provisional application Ser. No. 60/604,608 filed Aug. 26, 2004; and, (ii) U.S. provisional application Ser. No. 60/626,276 filed Nov. 9, 2004; and the disclosures of these provisional applications are hereby expressly incorporated by reference into this specification.

BACKGROUND

Inverted tooth chains have long been used to transmit power and motion between shafts in automotive applications and they are conventionally constructed as endless chains with ranks or rows of interleaved inside link plates each having a pair of toes, and having aligned apertures to receive pivot pins to join the rows and provide articulation of the chain as it drivingly engages the sprocket teeth either at the inside flanks or at the outside flanks of the link plate teeth at the onset of meshing with the driving and driven sprockets. Although both meshing styles have been used for automotive timing drives, inside flank engagement is more commonly used for these drives. Guide link plates are located on opposite sides of alternating rows of inside link plates in order to position the chain laterally (axially with respect to the axis of rotation) on the sprockets.

FIG. 1 shows a conventional inverted tooth chain drive system 100 with an inverted tooth chain 110 in meshing contact with drive sprocket 150 as the sprocket rotates clockwise about its center X (axis of rotation), and another sprocket not shown. The sprocket 150 includes a plurality of teeth 160 each having an engaging flank 162 and the teeth are symmetrical about their tooth centers TC and are all substantially identical. The sprocket 150 has a total of N teeth, and the tooth centers TC are spaced A degrees from each other, where A=360/N. The illustrated tooth flanks 162 have an involute form, but can alternatively comprise a radial arc shape and/or comprise or be defined by a straight-sided profile (flat). The outside diameter OD and root diameter RD define the outer and inner radial limits of the tooth flanks. As shown in FIG. 1, the chain link plates do not contact either the outside diameter OD or the root surface 165 as defined by root diameter RD. The teeth 160 are identical to each other and are evenly spaced circumferentially from each other, with tooth centers TC located every 360/N degrees, where N is the total number of teeth.

FIG. 2A illustrates first and second rows 130a, 130b of chain 110. The conventional inside link plates 130 of each row have toes 138 which are each defined by inside flanks 135 and outside flanks 136 interconnected by a tip 137 defined by a radius and/or other surface. In the illustrated embodiment, outside flanks 136 are straight-sided and the inside flanks 135 have a convexly arcuate form and are joined by a crotch 134. In particular, the inside flanks 135 of each link 130 are defined by a radius R that preferably blends into the tip 137 of the relevant toe 138 and into the crotch 134 at the opposite end. When the chain is pulled straight as shown in FIG. 2A (it's nominal orientation as it moves into engagement with the sprocket 150 from the span during use), the inside flanks 135 project outwardly from the adjacent overlapping outside flanks 136 of preceding link row by a projection height λ, thereby permitting the inside flanks 135 of a row 130a, 130b to make initial meshing contact with an engaging flank 162 of a sprocket tooth 160 at the onset of meshing. FIG. 2B is a plan view of the chain 110 and shows a standard chain lacing having rows 130a, 130b, 130c, etc. of interleaved inside links 130, with successive rows pivotally interconnected by pivot pins 140 or rocker-type joints (the term "pin" is intended to encompass a simple pin or a rocker joint or any structure that pivotally joins successive link rows 130a, 130b, 130c. Other inside link lacings having stacked inside links 130 across a row are also commonly used.

Referring again to FIG. 1, the chain 110 approaches the drive sprocket 150 substantially along the tangent line TL (at the centers of the chain pins 140) in a taut strand and meshing occurs as the chain inside links 130 of rows 130a, 130b, 130c collide with an engaging flank tooth face 162. When the chain 110 moves into the wrap of the sprocket and is fully meshed with the sprocket 150, the centers of the pins 140 travel along and define a circular path referred to as the pitch diameter PD.

Referring now to FIG. 3, which is an enlarged view of FIG. 1, link plate rows 130a and 130b of chain 110 are shown at the instant of simultaneous meshing contact with the engaging flank 162 of tooth 160b, i.e., in a state between initial contact with only the leading inside flanks 135 of link row 130b and transition to engagement only with trailing outside flanks 136 of a preceding link row 130a. Link row 130b is making leading inside flank meshing contact IF with tooth flank 162 and link plate row 130a has just rotated into trailing outside meshing contact OF to affect this simultaneous meshing contact. As sprocket 150 continues its rotation, inside flanks 135 of link plate row 130b will separate from contact with the engaging flank 162 of tooth 160b and will continue to further separate until the sprocket rotation articulates link plate row 130b to its chordal position in the sprocket wrap, which occurs when its trailing outside flanks 136 come into meshing contact OF with engaging flank 162 of tooth 160c. It should be noted that the transition from leading inside flank contact of link row 130b to trailing outside flank-to-tooth contact of preceding link row 130a, as described, is not believed to contribute in any significant measure to the meshing impact noise levels in that the initial meshing and driving engagement of the chain links with the sprocket teeth 160 occur at the inside flanks 135 at the onset of meshing, and it is this initial chain-sprocket meshing impact that is believed to be the major noise source. The meshing cycle for a link row starts with initial meshing contact IC and ends when the link row articulates to, and is seated at, its chordal position in the sprocket wrap, having only trailing outside flank contact OF.

It is important to note that initial contact IC between the chain 110 and sprocket 150 is always inside flank meshing contact IF. Inside flank contact IF (see FIG. 3) continues even after the initial contact IC, as shown in FIG. 4, since initial contact by definition occurs at the instant when the leading inside flanks 135 of a chain row first make inside flank meshing contact IF with a sprocket tooth 160, and the inside flanks 135 of the chain link row remain substantially in contact with the engaging flank 162 of a sprocket tooth 160 until the meshing transition to the outside flank meshing OF occurs, following which the inside flanks 135 will separate from contact with the tooth face 162.

Referring again to FIG. 4, the drive sprocket 150 has continued to rotate in a clockwise direction, relative to the position shown in FIG. 3, until link plate row 130c is at the onset of initial meshing contact IC with sprocket tooth 160c. The angle θ is shown to be the angle between a base reference line VL originating at the sprocket center (axis of rotation X) and passing through the sprocket teeth at the 12 o'clock (i.e., top-dead-center) position, and another reference line CL originating at the sprocket center X and passing through the initial meshing contact point IC at tooth 160*c*, and this is the angle at which initial meshing contact IC will occur between the leading inside flanks 135 of a chain row 130*a*, 130*b*, etc. and any tooth 160 in the symmetrical drive sprocket 150, i.e., at the instant of initial contact between a row of chain link plates 130 and a sprocket tooth 160, the angle θ will always be defined as the angle between the base reference line VL and the second reference line CL extending between the sprocket center and the initial meshing contact point IC.

Chain-sprocket impact at the onset of meshing is the dominant noise source in chain drive systems and it occurs as the chain links leave the span and collide with a sprocket tooth at engagement. Transverse vibration in the "free" or unsupported span as the chain approaches the sprocket along the tangent line TL will add to the severity of the meshing impact. The resultant impact noise is repeated with a frequency generally equal to that of the frequency of the chain meshing with the sprocket. Many attempts to reduce the noise associated with inverted tooth chain drives have been related to the chain-sprocket meshing phenomenon. It is well known in the art that an inverted tooth chain having inside flank meshing will generally provide a smooth chain-sprocket engagement. The noise generation associated with chain-sprocket meshing impact, however, still occurs for inside flank meshing contact and it is an object of the present invention to reduce these noise levels.

SUMMARY

In accordance with the present development, an inverted tooth chain drive system includes a sprocket supported for rotation about an axis of rotation and comprising a plurality of teeth defined relative to respective tooth centers. The tooth centers are spaced evenly in a circumferential arrangement about the axis of rotation, and each of the plurality of teeth includes an engaging flank. An inverted tooth chain is engaged with the sprocket and includes a plurality of rows of links each structured for inside flank engagement with the sprocket, with leading inside flanks of each row of links projecting outwardly relative to the trailing outside flanks of a preceding row of links. The leading inside flanks of each row are positioned to make initial meshing contact with the engaging flank of one of the sprocket teeth. At least some of the teeth are standard teeth and other ones of the teeth are flank-relieved teeth. The engaging flanks of the flank-relieved teeth are negatively offset relative to their respective tooth centers as compared to said engaging flanks of said standard teeth relative to their respective tooth centers.

In accordance with another aspect of the present development, a sprocket is adapted to mesh with an inside flank engagement inverted tooth chain. The sprocket includes a plurality of teeth defined relative to respective tooth centers, wherein the tooth centers are spaced evenly in a circumferential arrangement about said axis of rotation, and wherein each of said plurality of teeth includes an engaging flank. At least some of the teeth are standard teeth and others of the teeth are flank-relieved teeth, with the engaging flanks of the flank-relieved teeth negatively offset relative to their respective tooth centers as compared to the engaging flanks of the standard teeth relative to their respective tooth centers.

In accordance with another aspect of the present development, a method of meshing an inverted tooth chain with a sprocket includes rotating a sprocket while teeth of the sprocket are engaged with an inverted tooth chain so that leading inside flanks of each row of links of the inverted tooth chain make initial contact with an engaging flank of a sprocket tooth and, after making initial contact, fully mesh with the sprocket, wherein the sprocket comprises: (i) a plurality of standard teeth having standard engaging flanks; and, (ii) a plurality of flank-relieved teeth having flank-relieved engaging flanks that are negatively offset relative to the standard engaging flanks. The step of rotating the sprocket includes rotating the sprocket a first angular distance so that a first row of links of the chain fully meshes with a first standard tooth. The sprocket is rotated a second angular distance so that a second row of links of the chain makes said initial contact with a second standard tooth that is preceded by the first standard tooth. The second angular distance measured from an instant when the first row of links of the chain first becomes fully meshed with the first standard tooth. The sprocket is rotated a third angular distance so that a third row of links of the chain makes initial contact with a flank-relieved tooth that is immediately preceded by the second standard tooth, wherein the third angular distance is measured from an instant when the second row of links of the chain first becomes fully meshed with the second standard tooth, wherein the third angular distance exceeds the second angular distance.

BRIEF DESCRIPTION OF DRAWINGS

The invention comprises various components and arrangements of components, preferred embodiments of which are illustrated in the accompanying drawings wherein:

FIGS. 7A, 7B, 7C, 7D, and 7E are greatly enlarged views of the chain drive system of FIG. 5A and illustrate frequency modulated meshing of the chain with the sprocket according to the present invention;

FIG. 8B graphically illustrates the pattern of conventional and flank-relieved teeth and initial meshing contact angles for the sprocket of FIG. 8A;

FIG. 8C graphically illustrates the pattern of conventional and flank-relieved teeth and initial meshing contact angles for a chain with a slightly elongated pitch length meshing with the sprocket of FIG. 8A;

FIG. 9B is a greatly enlarged illustration of a second embodiment of a flank-relieved tooth for the sprocket of FIG. 9A, with a conventional tooth profile overlay shown using a phantom line;

FIG. 11 graphically illustrates the pattern of conventional and flank-relieved teeth and initial meshing contact angles for a chain with a slightly elongated pitch length meshing with the sprocket of FIG. 9A.

DETAILED DESCRIPTION OF THE INVENTION

Figure 1:
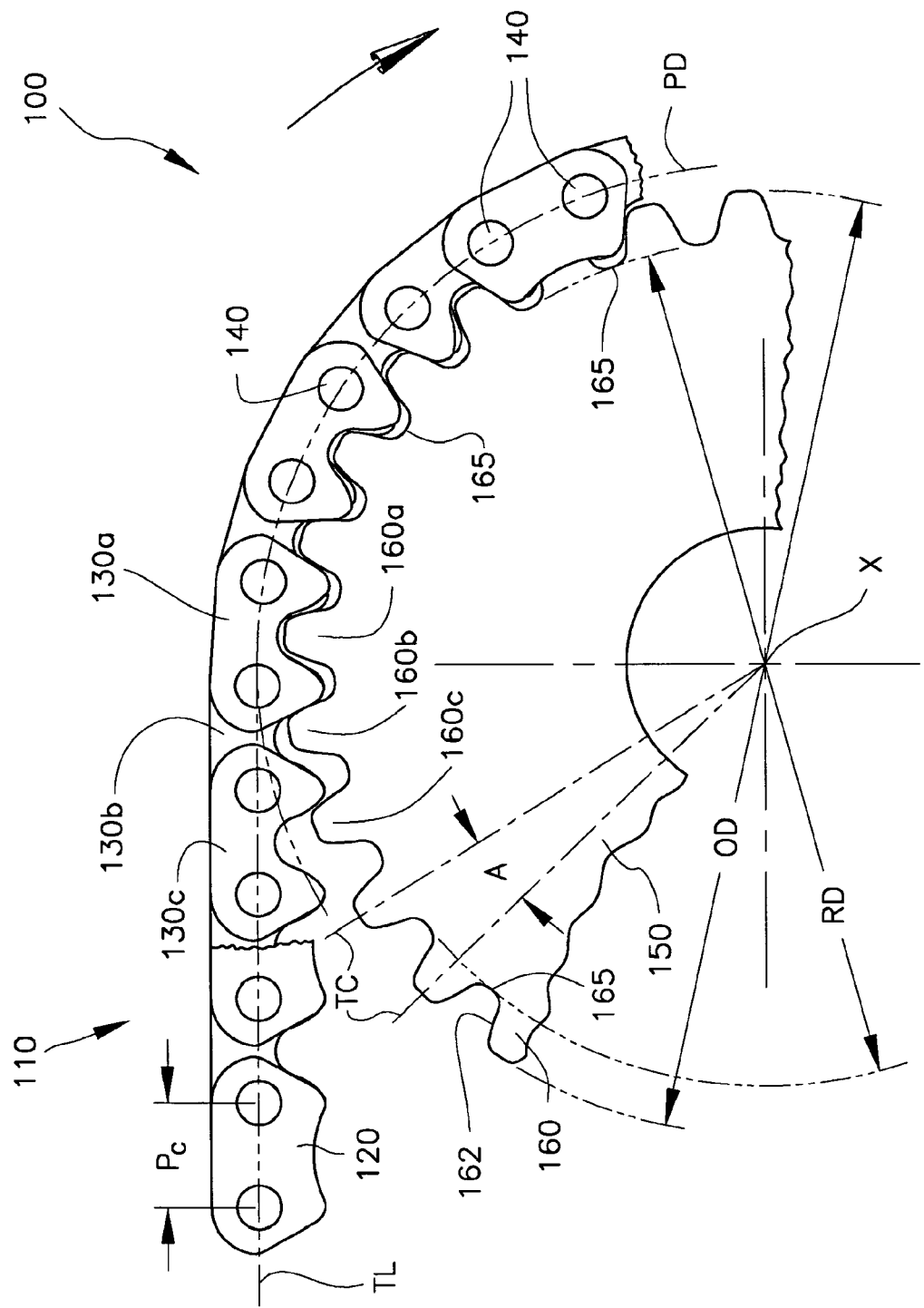
FIG. 1 is a partial front elevational view of a chain drive system comprising a conventional inverted tooth chain (with some of the guide links removed for clarity) meshing with a conventional inverted tooth sprocket with inside flank meshing.
Figure 2A:
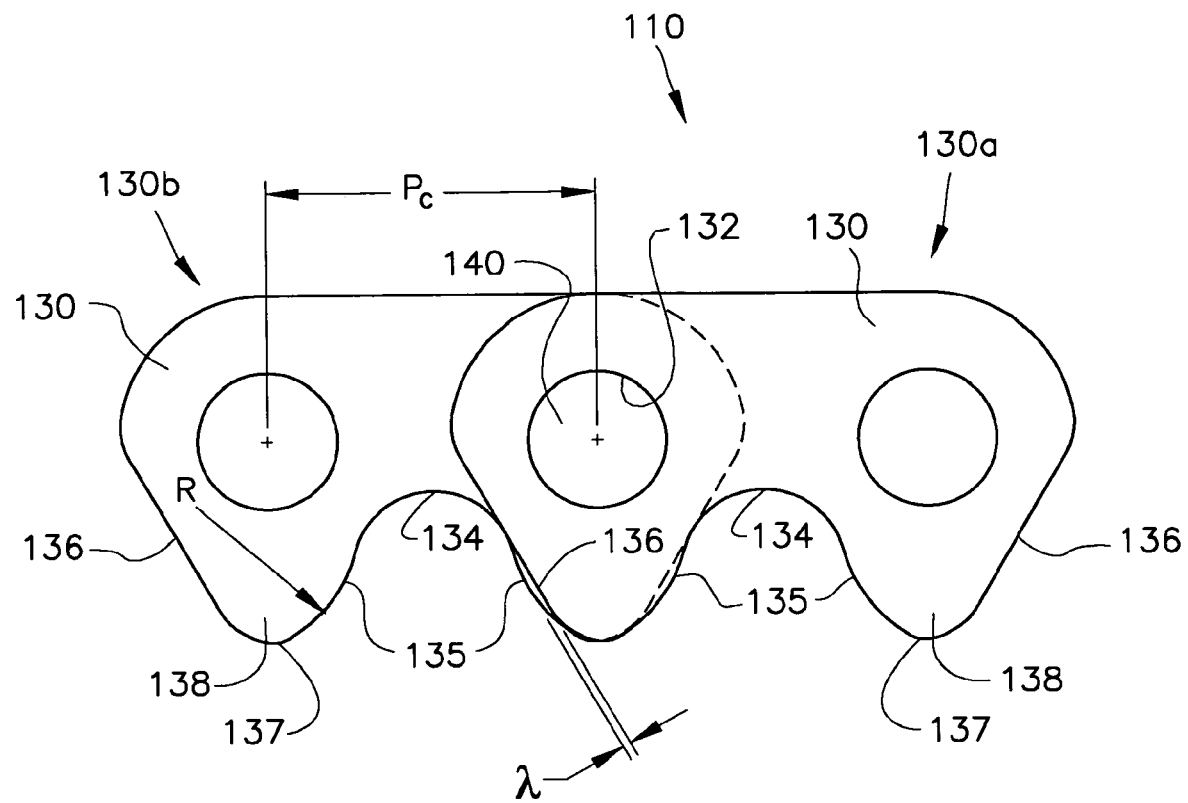
FIG. 2A is a greatly enlarged illustration of first and second rows of inside link plates of the inverted tooth chain shown in FIG. 1.
Figure 2B:
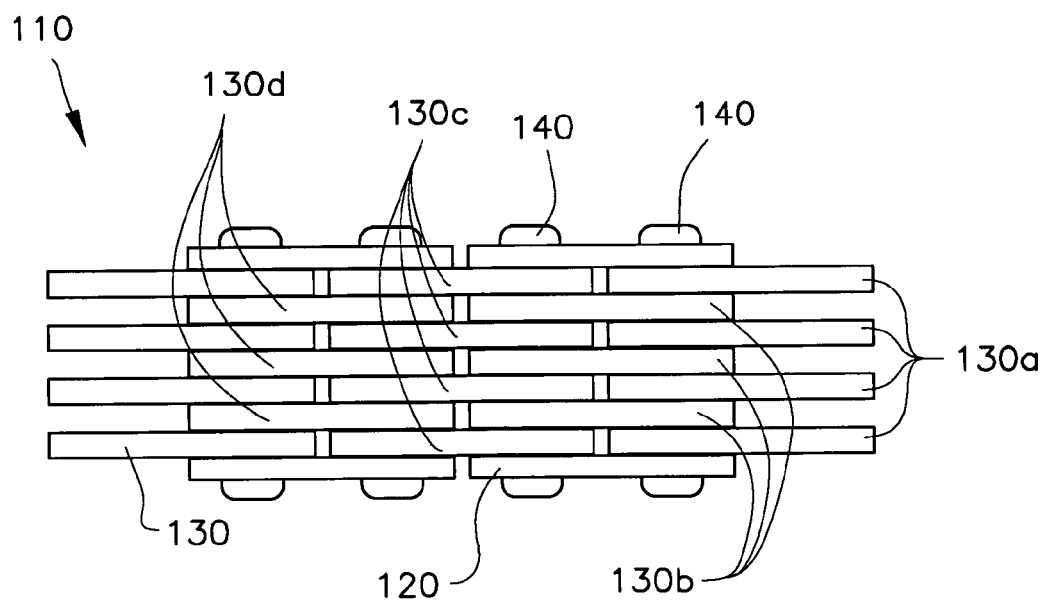
FIG. 2B is a top plan view of the inverted tooth chain of FIG. 1.
Figure 3:
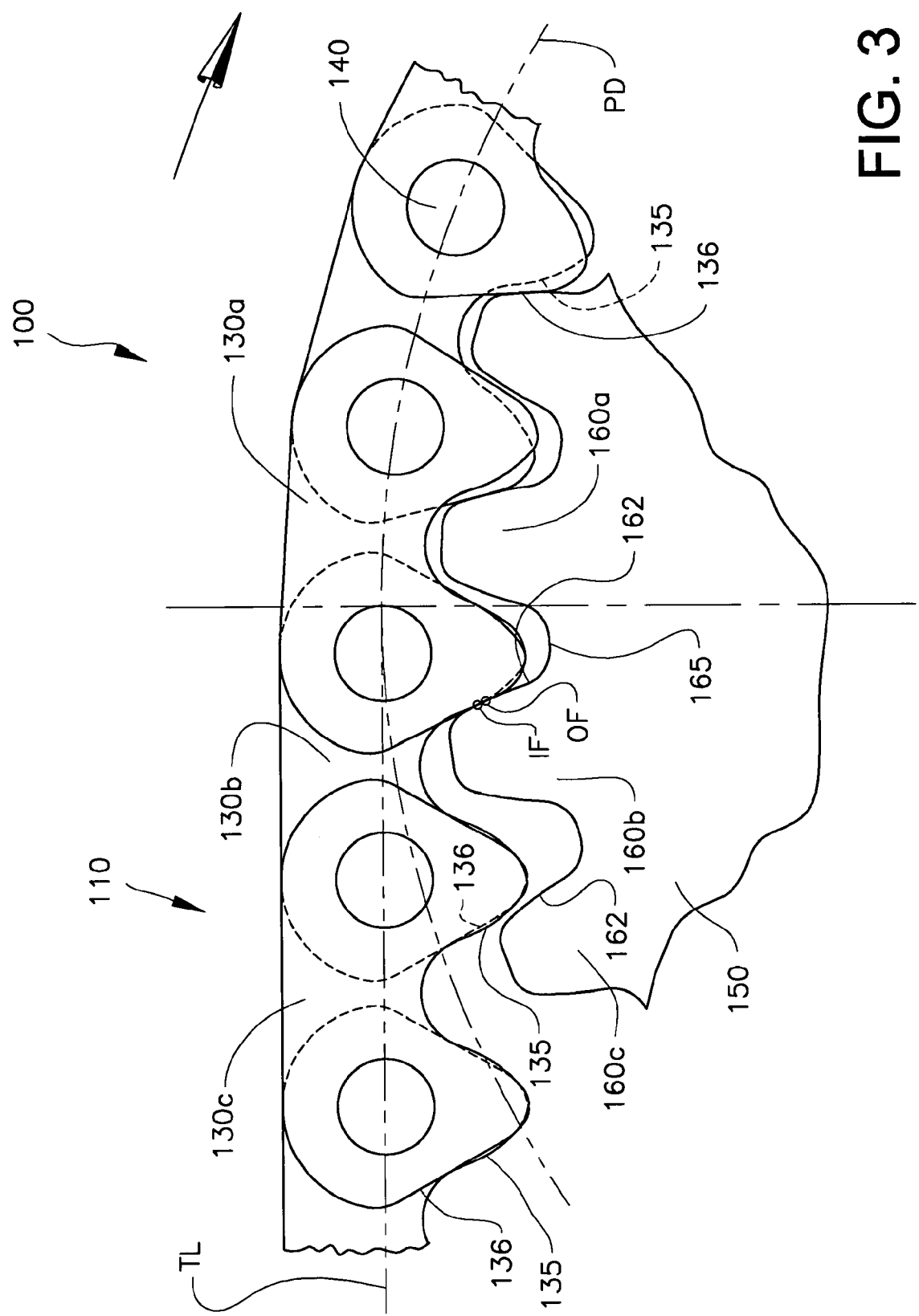
FIG. 3 is an enlarged view of the chain drive system of FIG. 1.
Figure 4:
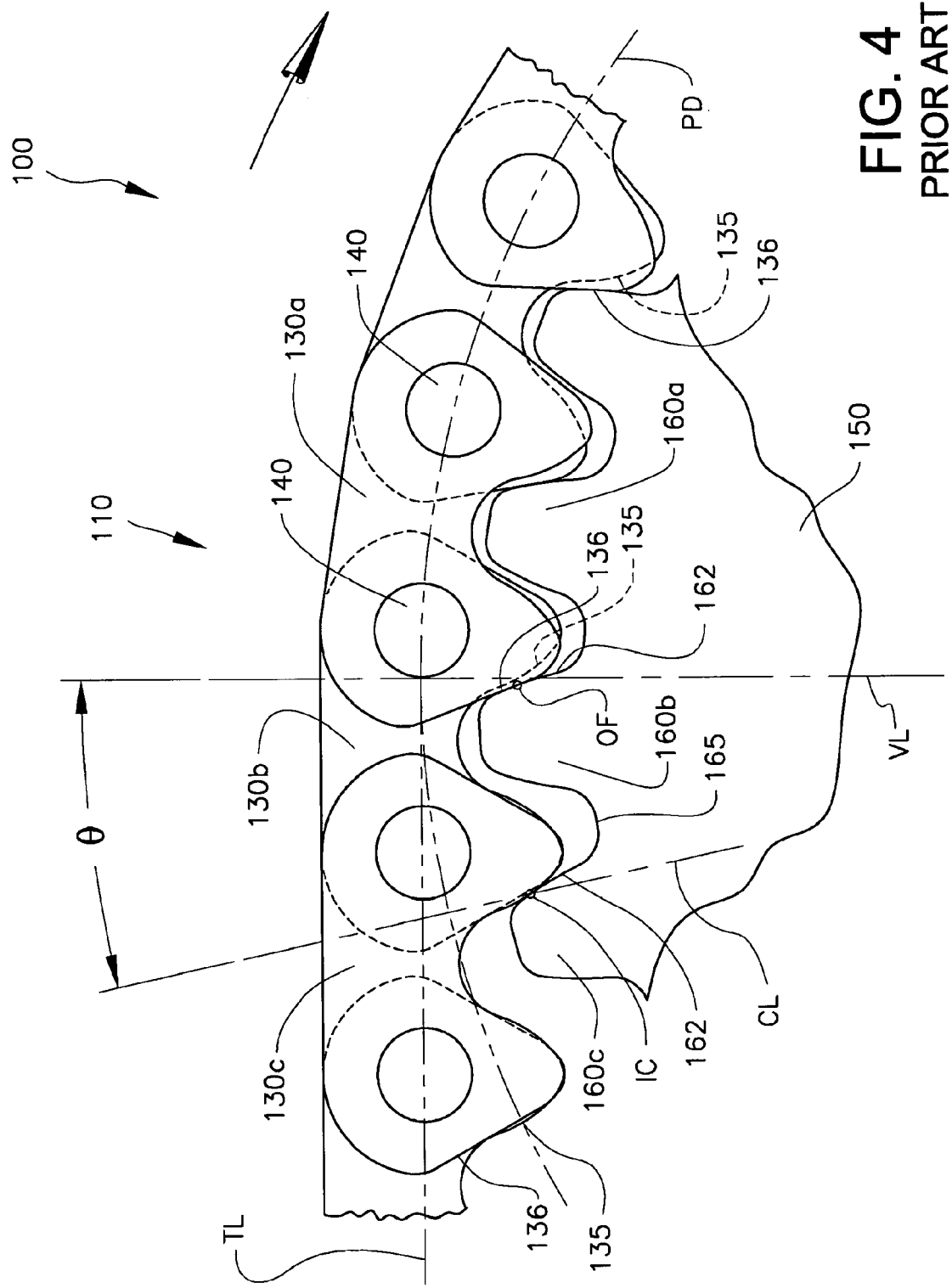
FIG. 4 corresponds to FIG. 3 with the sprocket rotated to a new position.
Figure 5A:
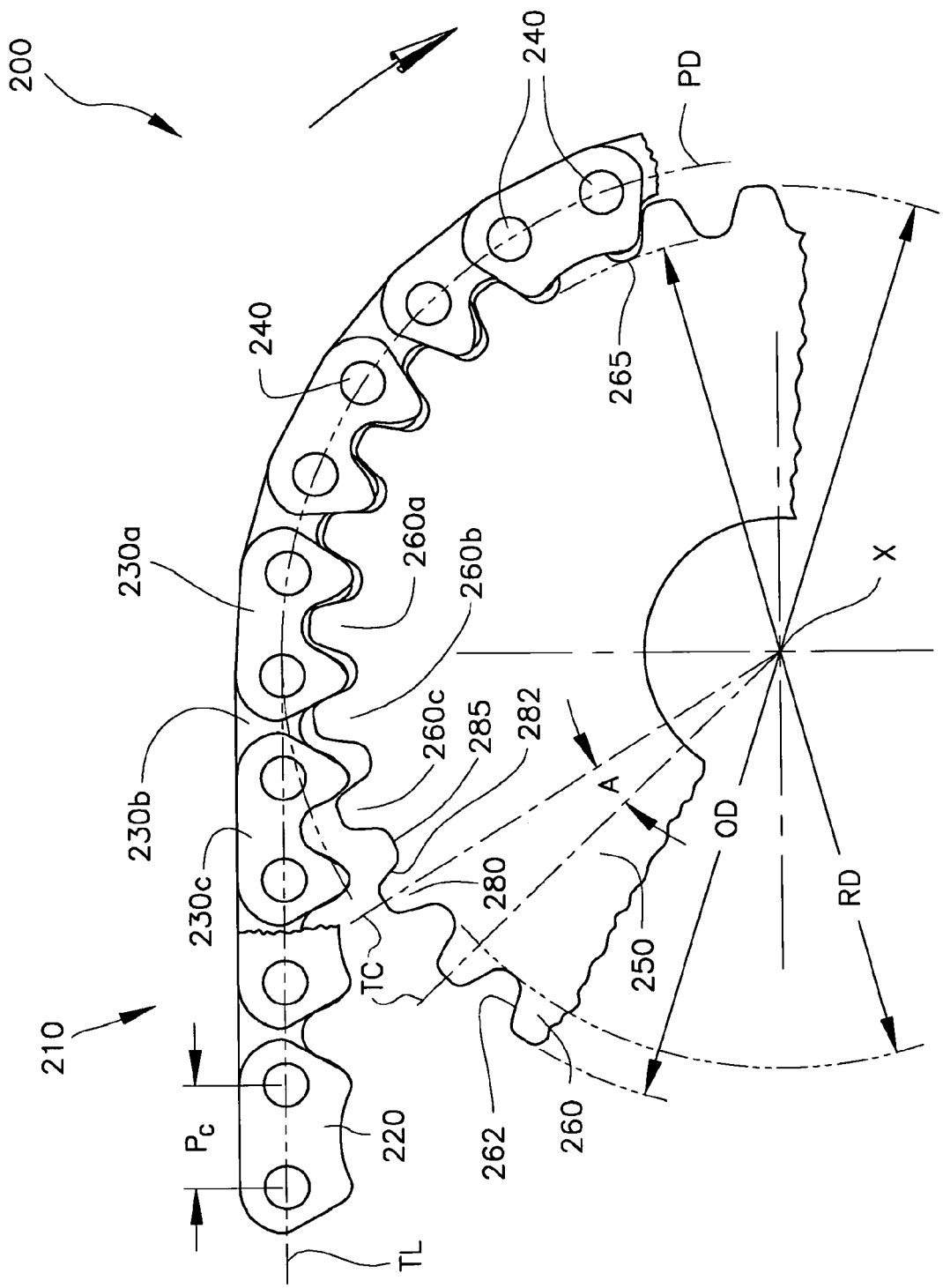
FIG. 5A is a partial front elevational view of a chain drive system comprising a conventional inverted tooth chain (with some guide links removed for clarity) meshing with a sprocket formed in accordance with the present invention.
Figure 5B:
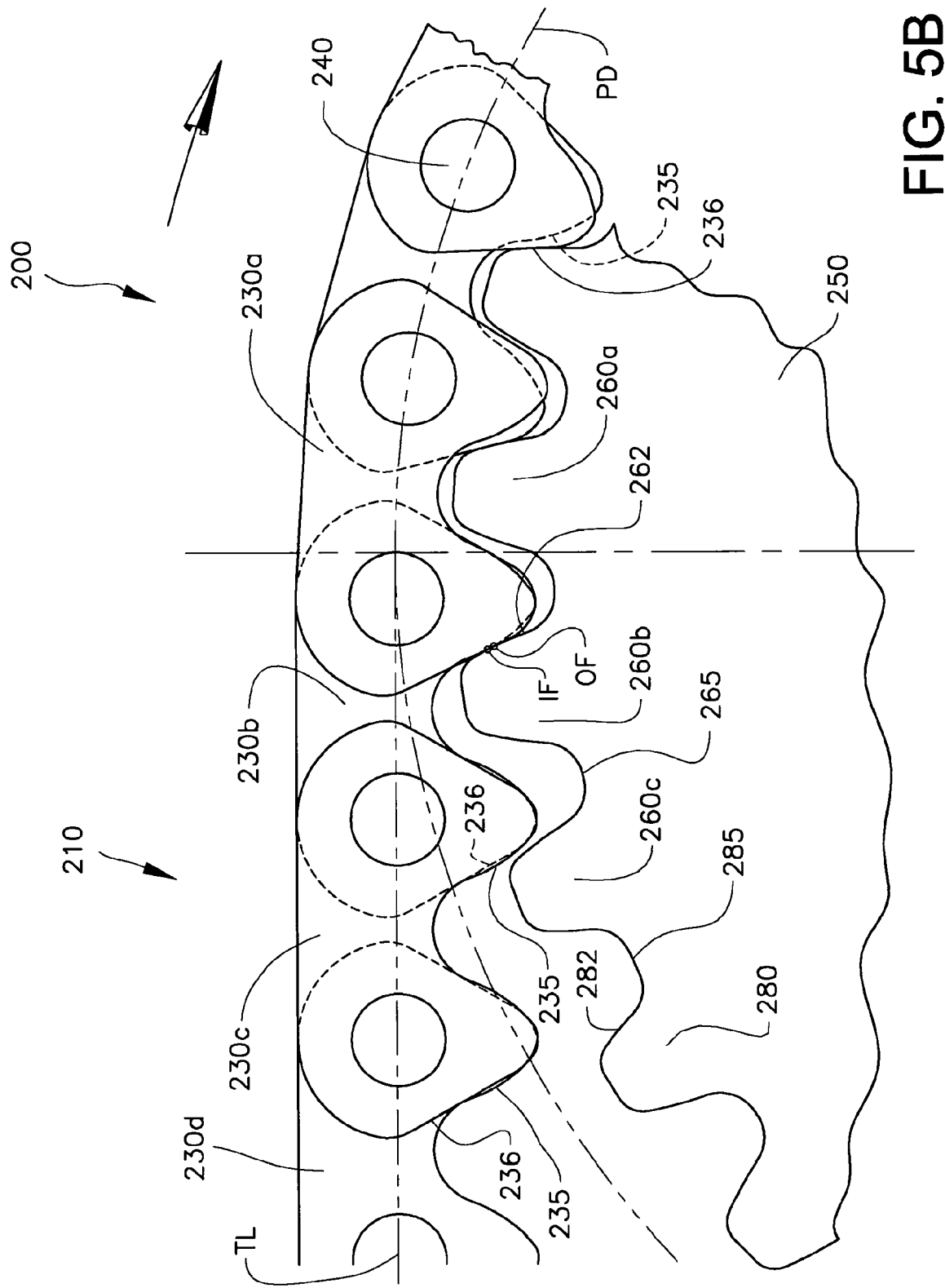
FIG. 5B is an enlarged view of the chain drive system of FIG. 5A.

As shown in FIG. 5A, and more clearly in FIG. 5B, inverted tooth chain drive system 200 is comprised of inverted tooth chain 210 in meshing contact with a drive sprocket 250 as the sprocket rotates clockwise, and another sprocket not shown. The illustrated chain 210 is identical to the chain 110 and, thus, like components of the chain 210 relative to the chain 110 are identified with reference characters that are 100 greater than those used in connection with the chain 110. It is not intended that a sprocket formed in accordance with the present invention be limited for use with the illustrated inverted tooth chain or any other particular style of inverted tooth chain. The inverted tooth chain sprocket 250 is formed in accordance with the present invention with tooth flanks having an involute form but the flanks may include a radial form instead of an involute form and/or can comprise or be defined by one or more flats without departing from the overall scope and intent of the present invention.

Referring specifically to FIG. 5B, which is an enlarged portion of FIG. 5A, link plate rows 230a and 230b are shown to have simultaneous meshing contact with the engaging flank 262 of tooth 260b. Leading inside flanks 235 of row 230b are making inside flank meshing contact IF and link plate row 230a has just rotated sufficiently so that its trailing outside flanks 236 move into outside meshing contact OF to effect this simultaneous contact. This simultaneous contact is defined as "transition contact" and, with the next increment of rotation of sprocket 250, inside flanks 235 of link plate row 230b will start to separate from the engaging flank 262 of tooth 260b, and will continue to further separate from the tooth until the sprocket rotation articulates link plate row 230b to its chordal position in the sprocket wrap, which occurs when its trailing outside flanks 236 come into meshing contact OF with engaging flank 262 of tooth 260c. The terms "leading" and "trailing" as used herein are used with reference to the direction of rotation of the sprocket 250 and movement of the chain 210, so that the phrase "leading inside flanks 235" refers to the inside flanks 235 of a chain link row 230 that are first to encounter the sprocket 250.

Figure 5C:
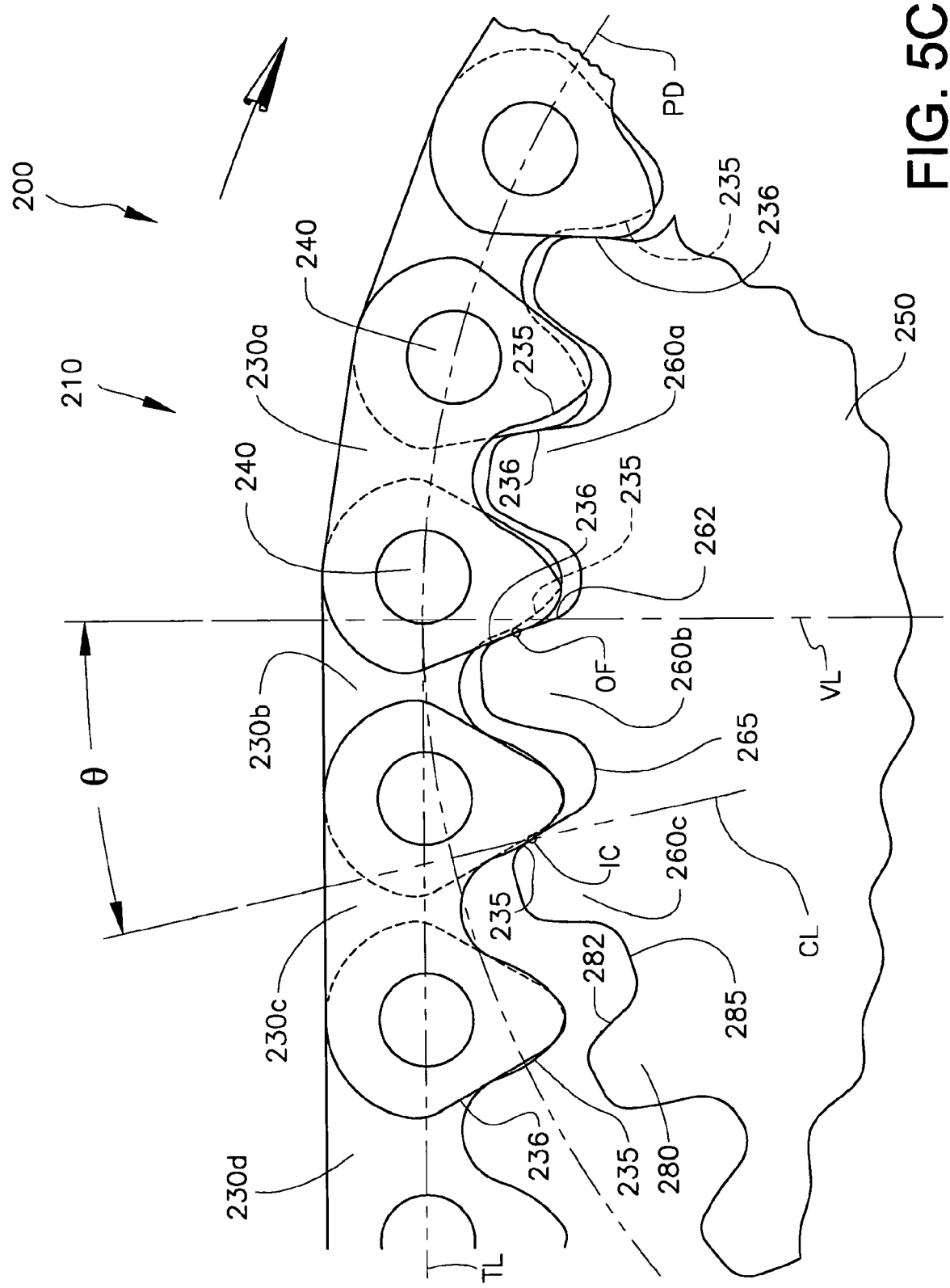
FIG. 5C corresponds to FIG. 5B with the sprocket rotated to a new position.

As illustrated in FIG. 5C, the sprocket 250 is rotated in a clockwise direction relative to the position shown in FIG. 5B until the leading inside flanks 235 of link row 230c are at the onset of initial meshing contact IC with engaging flank 262 of tooth 260c. Teeth 260, i.e., 260a, 260b, 260c, etc. are standard sprocket teeth such as the teeth 160 described above in connection with FIGS. 1-4 and, thus, serve to define the initial contact angle θ for sprocket 250, and this angle is equal to the angle previously defined for conventional sprocket 150 having a full complement of standard sprocket teeth 160 (of course, the angle θ will vary from application to application depending upon the sprocket chordal pitch, the number of sprocket teeth, and/or other factors). The angle θ is defined relative to the 12 o'clock base reference line VL as defined above. Referring still to FIG. 5C, link plate row 230d will follow link plate row 230c as the next link row to mesh with sprocket 250 and it will mesh with tooth 280, which is formed in accordance with the present invention to have an engaging flank profile 282 that is dimensioned and/or shaped differently as compared to teeth 260.

Figure 5D:
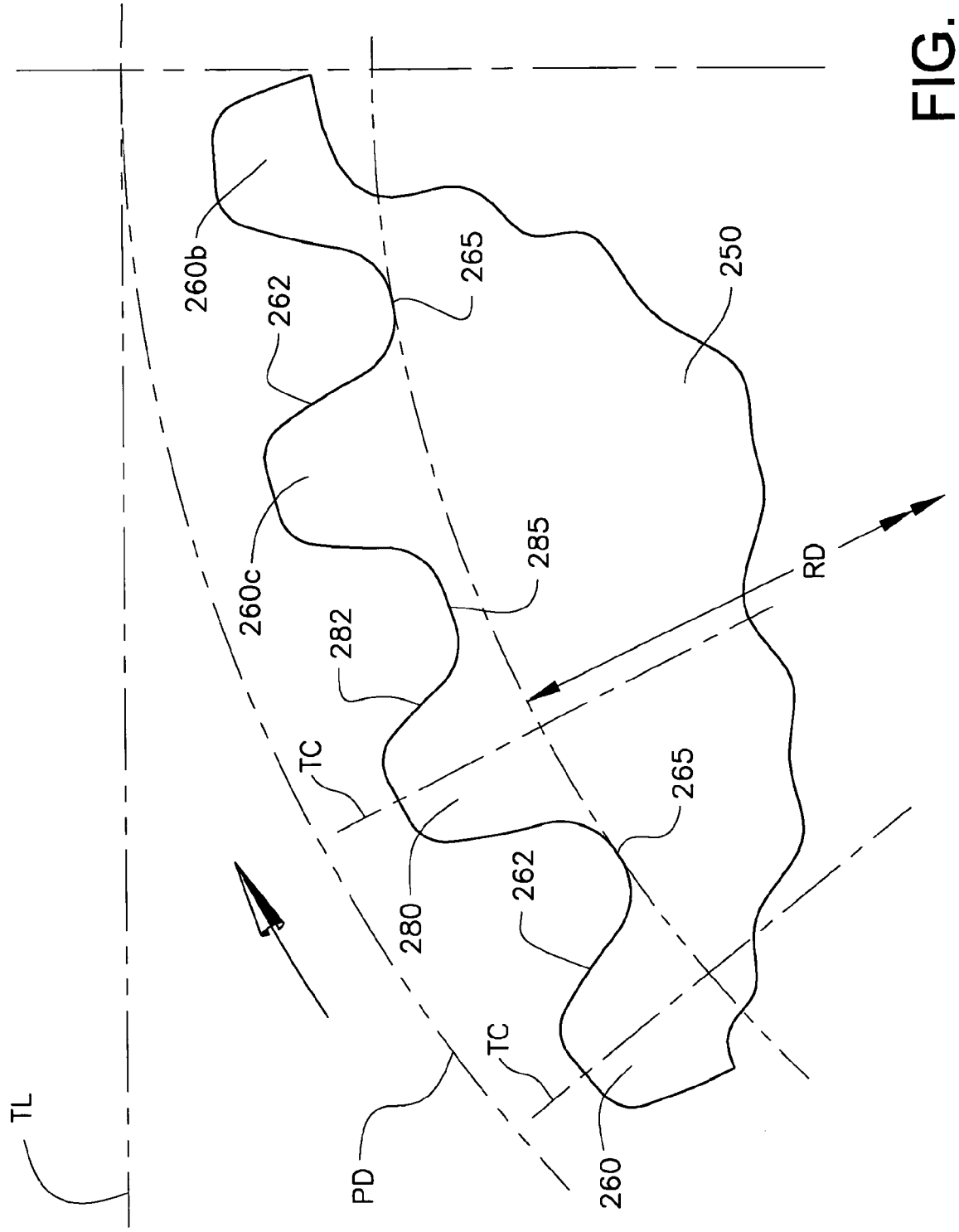
FIG. 5D is a partial enlarged view of the sprocket of FIG. 5A without showing the chain.
Figure 6:
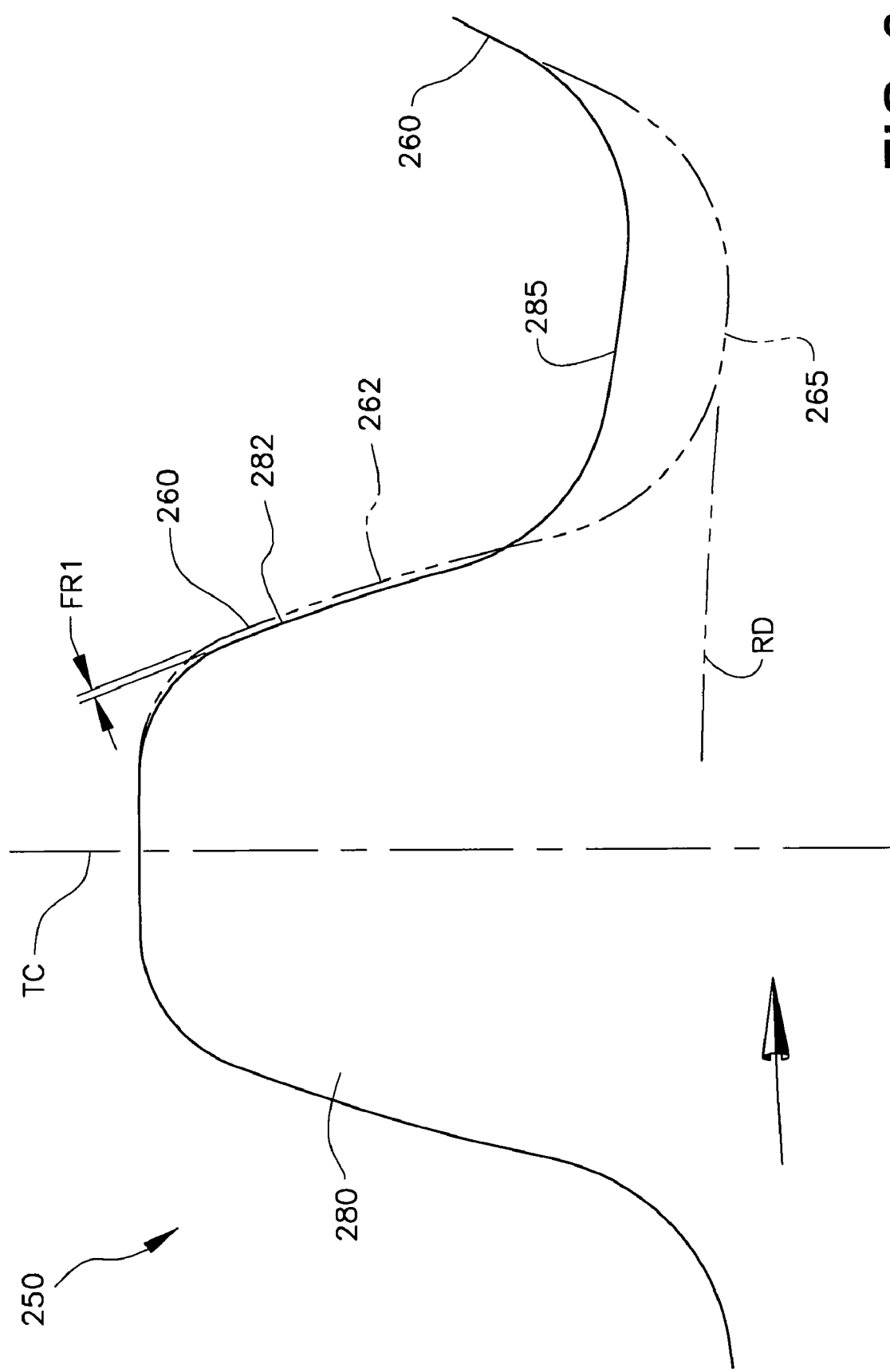
FIG. 6 is a greatly enlarged illustration of a flank-relieved tooth of the sprocket shown in FIG. 5A, with the conventional tooth profile shown as an overlay using a phantom line.

As shown in FIG. 5D, and more clearly in FIG. 6, tooth 280 has an adjacent leading root surface 285 (leading in terms of direction of rotation of sprocket) that is positioned radially outward of the root surface 265 of the standard tooth form, and an engaging flank 282 is negatively offset or "relieved" relative to the engaging flank 262 of teeth 260 in terms of the sprocket rotation direction as shown to beneficially provide flank relief FR1. In FIG. 6, engaging flank 262 of conventional tooth 260 is shown overlaid with flank-relieved tooth 280. This engaging flank relief FR1 is preferably in the range of 0.03-0.10 mm. It is important to note that the tooth center TC for tooth 280 is defined to be coincident with that of a non-flank relieved standard profile tooth 260 when the profiles are overlaid as shown. With continuing reference to FIG. 5D, the root surfaces 265 of conventional teeth 260 are tangent to the inscribed circle defined by root diameter RD. The root surface 285 forward of the engaging flank 282 of tooth 280 is shown to be positioned radially outward of the conventional root surface 265 and this is done in order to place a chain link row 230 that is fully meshed with a tooth 280 in its proper radial position in the sprocket wrap (see FIG. 7B, in which link row 230c has just articulated to its chordal position). Referring again to FIG. 6, this adjacent leading root surface 285 is clearly shown to incline radially inward toward the axis of rotation extending forward of tooth 280 away from the relieved engaging flank 282 toward a preceding tooth 260 and the reason for the incline will be explained below. The root surfaces 285 are sometimes referred to herein as "raised root surfaces."

It should be noted that the flank-relieved teeth 280 are not defined symmetrically about the tooth centers TC, owing to the negative offset of the engaging flank 282. As such, for a flank-relieved tooth 280 (or a standard tooth 260), the tooth center TC can also/alternatively be referred to as the tooth origin, i.e., the terms "tooth center" and "tooth origin" both describe the circumferential tooth location located 360/N degrees from the corresponding location on both preceding and succeeding teeth, where N equals the total number of teeth 260,280.

Figure 7A:
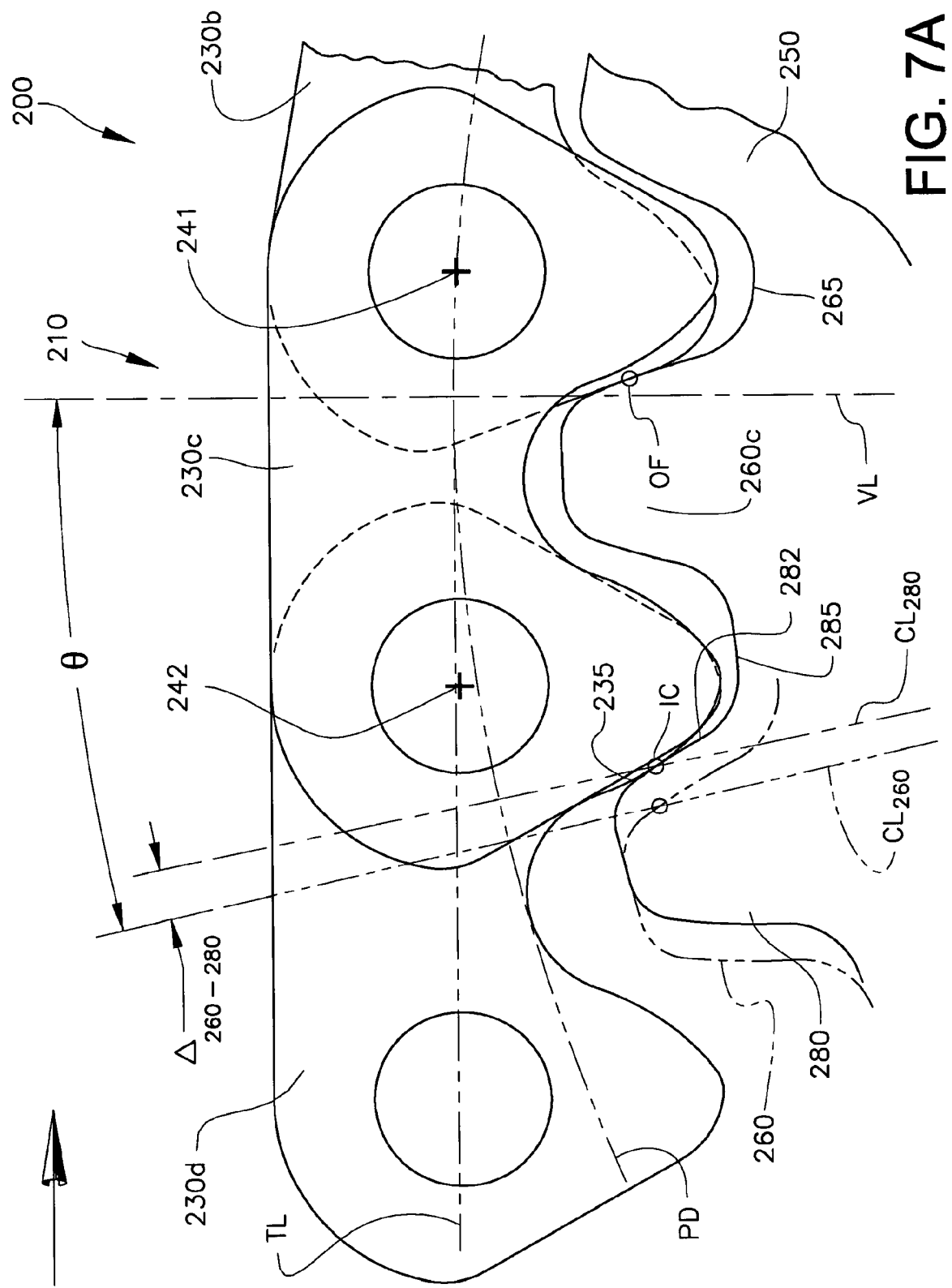

Referring now to FIG. 7A, inside link plate row 230d is shown at the instant of initial meshing contact IC with engaging flank 282 of flank-relieved tooth 280, and sprocket 250 had to rotate an additional amount, angle $\Delta_{260\text{-}280}$, for initial meshing contact IC to occur between leading inside link flanks 235 of link row 230d and engaging flank 282 of tooth 280 owing to the flank relief FR1 of tooth 280. This effectively and advantageously delays the initial meshing impact of link row 230d with tooth 280, thereby serving to modulate the meshing frequency of the drive sprocket 250. This will be apparent to those of ordinary skill in the art upon reviewing FIG. 7A where a standard tooth form 260 is overlaid in phantom lines on the tooth 280 at an angular position where initial contact IC with link row 230d would have been made with the standard tooth engaging flank 262 but for the relieved engaging flank 282 as compared to the flank. The inside flanks 235 of chain row 230d would have made initial contact with the standard tooth 260 at the angular position shown by the phantom line $CL_{260}$ but, because of the presence of the flank-relieved tooth 280, the sprocket had to rotate through the additional angle $\Delta_{260\text{-}280}$ in order to make initial contact with chain 210 as indicated by the line $CL_{280}$.

Referring still to FIG. 7A, it should be noted that link row 230b is in its seated chordal (fully meshed) position and, thus, pin center 241 connecting link rows 230b and 230c is in the sprocket wrap on the pitch diameter PD, with pin center 242 joining rows 230c,230d shown to be close to, but not yet in the wrap at the initial meshing contact IC of link row 230d.

Figure 7B:
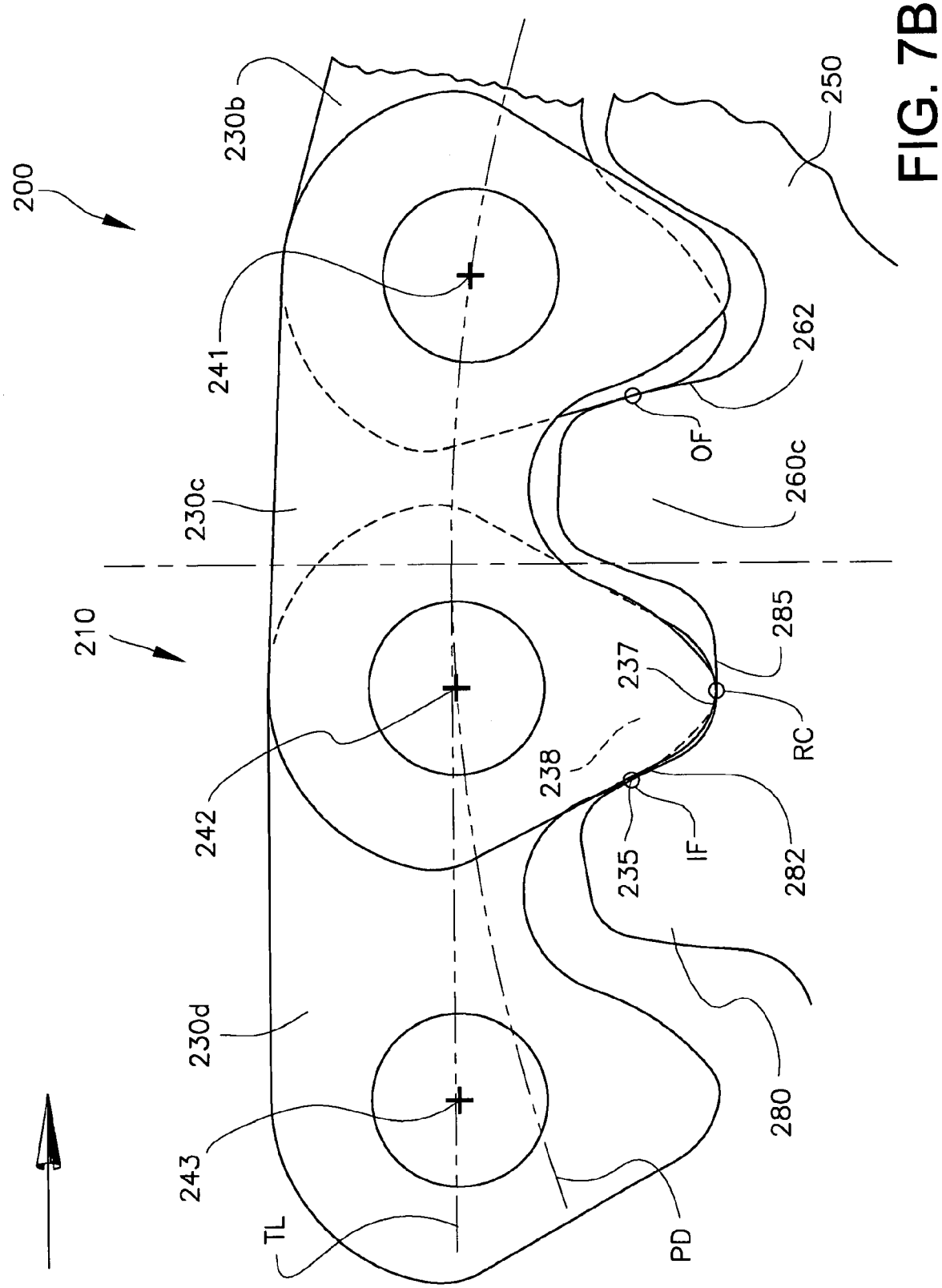

As illustrated by FIG. 7B, where sprocket 250 is shown rotated forward relative to FIG. 7A, the leading inside flanks 235 of link row 230d maintain tooth contact IF as the sprocket continues to rotate until the transition point for this root relieved tooth 280, which is shown to occur when toe tips 237 of trailing toes 238 of row 230c contact root surface 285 at root contact location RC, when row 230c is fully meshed, seated in its chordal position. When trailing toes 238 of link row 230c contact root surface 285, row 230c is then in its chordal position in the sprocket wrap and it should be noted that there is no outside flank meshing contact of its trailing outside flanks 236 with engaging flanks 282 of tooth 280, due to the flank relief FR1 (see FIG. 7C). Root surface 285 beneficially maintains link plate row 230c in hard contact with sprocket 250 at its chordal position, and pin center 242 is thus held on the pitch diameter PD. In other words, contact between chain 210 and root surface 285 places link row 230c in substantially the same position that it would occupy if were in full meshing contact in its chordal position with a standard tooth form 260 and prevents free floating of the chain 210.

Figure 7C:
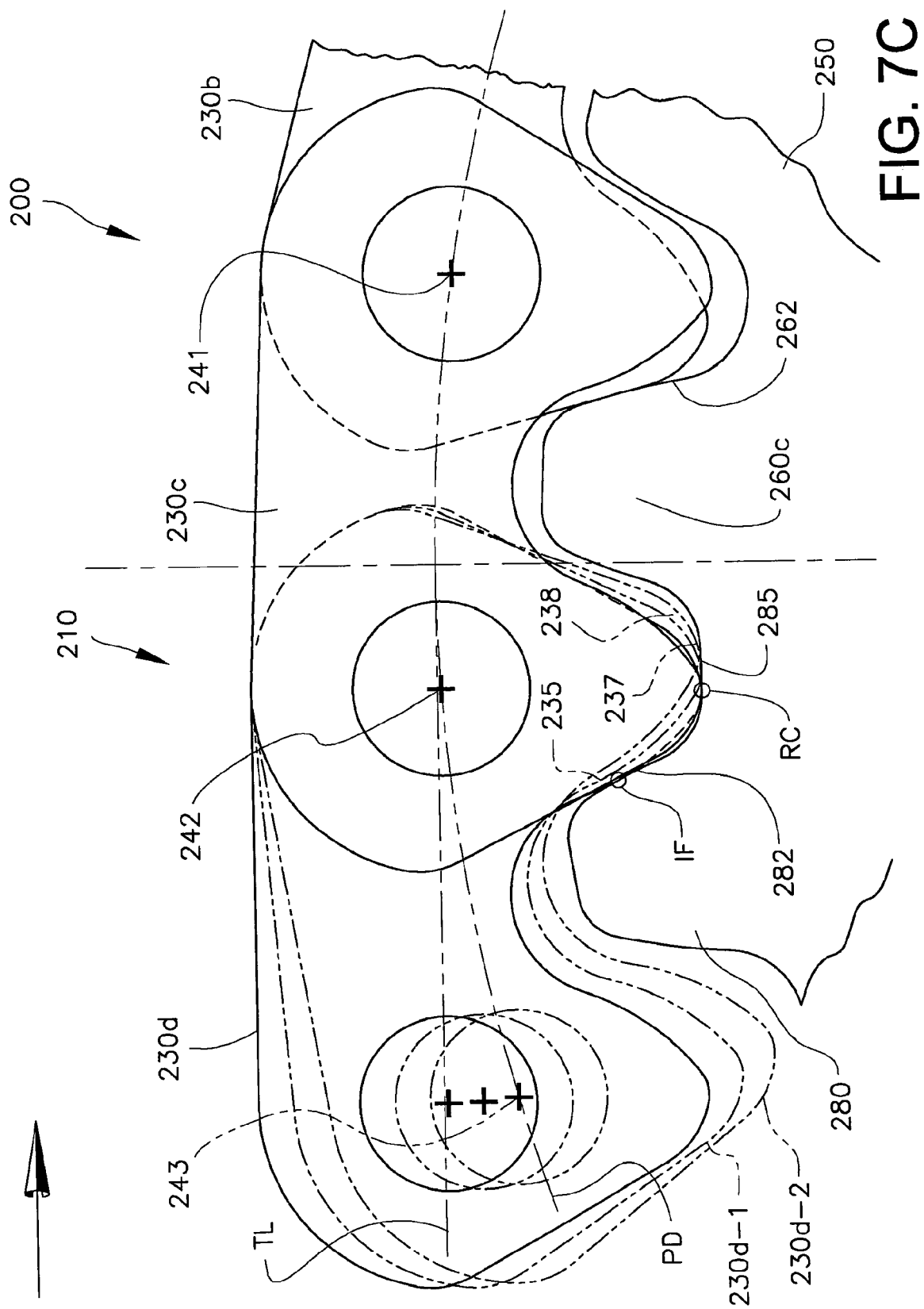

FIG. 7C shows the sprocket 250 positioned identically to FIG. 7B, but uses progressive phantom lines 230d-1,230d-2 to illustrate the full rotation of the link row 230d as it moves from its initial contact location into its fully meshed chordal position upon rotation of the sprocket (rotation of sprocket is not shown). It can be seen that as the link row 230d rotates about pin center 242 upon sprocket rotation, the inside flanks 235 of the leading toes 238 (i.e., the leading inside flanks 235) of link row 230d progressively separate from the sprocket tooth flank 282 and tips 237 of the leading toes 238 of all inside links 230 in row 230d move forward on or just above declining root surface 285 without any cam-action against surface 285 as would cause pin center 242 to move radially outward as indicated in the phantom lines. Of course, the tips 237 of leading toes 238 of row 230d must not include any lobes/projections as would cause lifting of pin center 242 away from surface 285. The "downhill" incline of root surface 285 forward of a tooth 280, therefore, ensures that the moving toe tips 237 of row 230d do not act in a cam-like fashion on root surface 285 during this aforementioned rotation of the leading toes 238 as would cause pin center 242 to be lifted above the pitch diameter PD as trailing pin center 243 moves onto the pitch diameter PD.

Figure 7D:
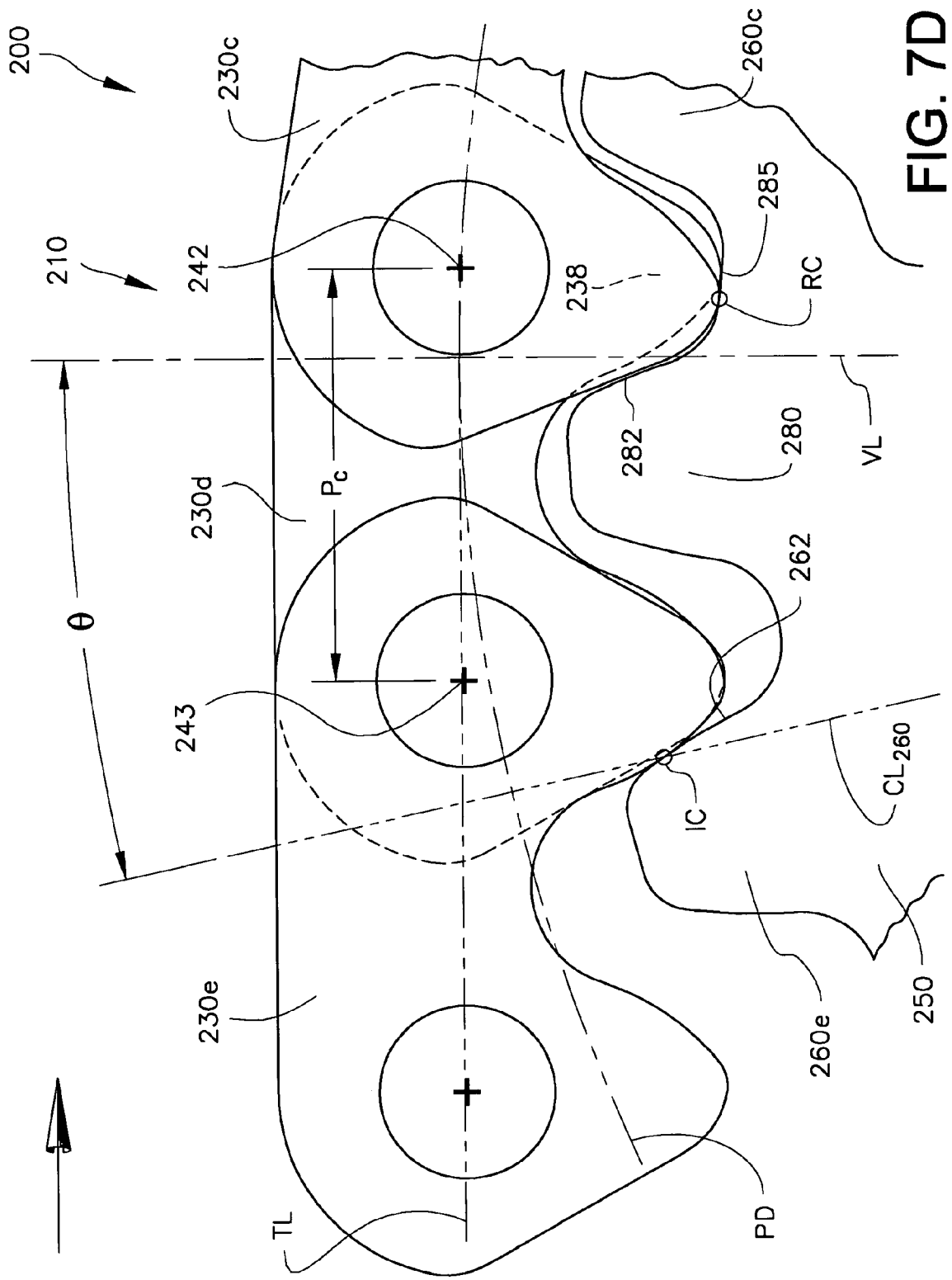

Referring now to FIG. 7D, where sprocket 250 is rotated forward another increment relative to FIG. 7B, link row 230e is shown at the onset of initial meshing contact IC with a standard tooth 260e following preceding link rows 230c and 230d. Link row 230c has already fully meshed with flank-relieved tooth 280 and is held at its chordal position in the sprocket wrap due to contact between its trailing toes 238 and root surface 285 as just described. FIG. 7E shows another incremental rotation of sprocket 250 to a point of transition (simultaneous) contact between link rows 230d,230e and also illustrates movement of leading toes 238 of row 230d relative to root surface 285 with no radial displacement of pin center 242 due to incline of root surface 285. It is important to note that for the meshing geometry illustrated in FIG. 7D, chain link pitch $P_C$ is equal to theoretical pitch, or 7.7 mm in this instance, resulting in link row 230c being substantially in the same radial and rotational position as it would be if it were meshed with a standard tooth 260. Accordingly, the initial contact angle θ for the link row 230e with standard tooth 260e is substantially the same as previously defined for any meshing with a standard tooth 260, i.e., the presence of flank-relieved tooth 280 preceding tooth 260d does not change the initial contact angle θ due to the root surface 285 and also due to the fact that, in the illustrated example, the chain link pitch $P_C$ is equal to a theoretical pitch.

Figure 7F:
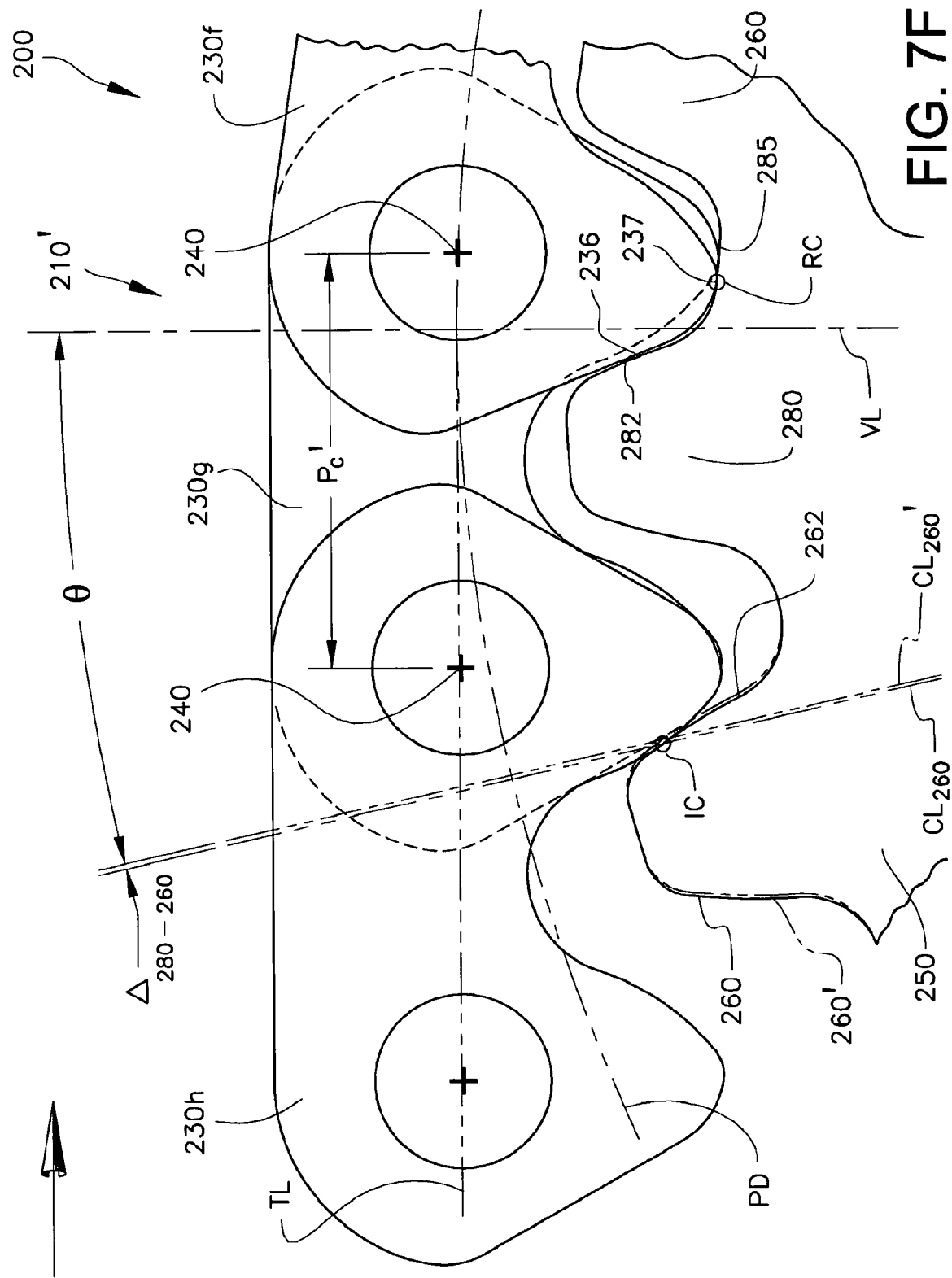
FIG. 7F is a greatly enlarged view of the chain drive system of FIG. 5A and illustrates a chain having a link pitch at the as-manufactured high limit meshing with a sprocket according to the present invention.

A new as-manufactured chain will have a link pitch length $P_C$ that will fall within specified manufacturing tolerance limits, and typically the low limit will be at, or very close to, minimum theoretical pitch $P_c$, and the high limit will approximately equal 1.0009 times theoretical pitch. It is well known in the chain manufacturing art, and is important to note, that link plates are typically batch processed and, accordingly, all link plates used to make each chain will have substantially the same link pitch $P_C$, and this link pitch will fall within the manufacturing tolerance limits as defined. Referring now to FIG. 7F, in real-world conditions, the system 200 will comprise a chain 210' that is identical to the chain 210 except that it has a link pitch $P_C{}'$ that is equal to a high limit as-manufactured chain, or 0.09% pitch elongation over minimum theoretical pitch. Link row 230f is shown in full meshing contact with sprocket 250 via contact between its trailing toe tips 237 and root 285 of flank-relieved tooth 280 at location RC. Although the link row 230f is in meshing contact with sprocket 250, the trailing outside flanks 236 thereof do not contact engaging flank 282 due to flank relief FR1 (FIG. 6), and, accordingly, this link row 230f is free to move closer to the engaging flank 282 as a function of the elongated link pitch $P_C{}'$. The next link row, 230g, has already had its initial meshing contact IC with flank-relieved tooth 280 and has separated from its inside flank IF contact. The next link row, 230h, is at the onset of initial meshing contact IC, and this meshing contact with standard tooth 260 is advanced by the angle $\Delta_{280\text{-}260}$, and this meshing modulation in the advanced direction (with respect to θ) is a result of the elongated pitch $P_C{}'$ in combination with the flank-relieved tooth 280 as described above.

Referring still to FIG. 7F, it is important to note that the initial meshing contact IC occurs earlier when a flank-relieved tooth 280 precedes a standard tooth 260 and the chain link pitch is greater than theoretical pitch, thereby advancing the meshing by an amount equal to angle $\Delta_{280\text{-}260}$. The angle $\Delta_{280\text{-}260}$ is defined as the angle between the radial lines $CL_{260'}$ and $CL_{260}$ where the line $CL_{260}$ passes through the center (axis of rotation X) of sprocket 250 and the initial contact location IC between tooth 260 and chain 210', and where the line $CL_{260'}$ passes through the center of the sprocket and the point where the tooth 260 would make initial contact with chain 210' if not preceded by the flank-relieved tooth 280. Those of ordinary skill in the art will recognize that this advancement of the initial meshing contact (increase in the angle $\Delta_{280\text{-}260}$) when a flank relieved tooth 280 precedes a standard tooth 260 (assuming a chain pitch $P_C{}'$ longer than $P_C$) is amplified even further when two or more successive flank relieved teeth 280 precede a standard tooth 260, at least to a point where further increases in $\Delta_{280-260}$ are not possible due to contact between the chain 210' and the relieved flank 282 of a preceding tooth 280.

Figure 8A:
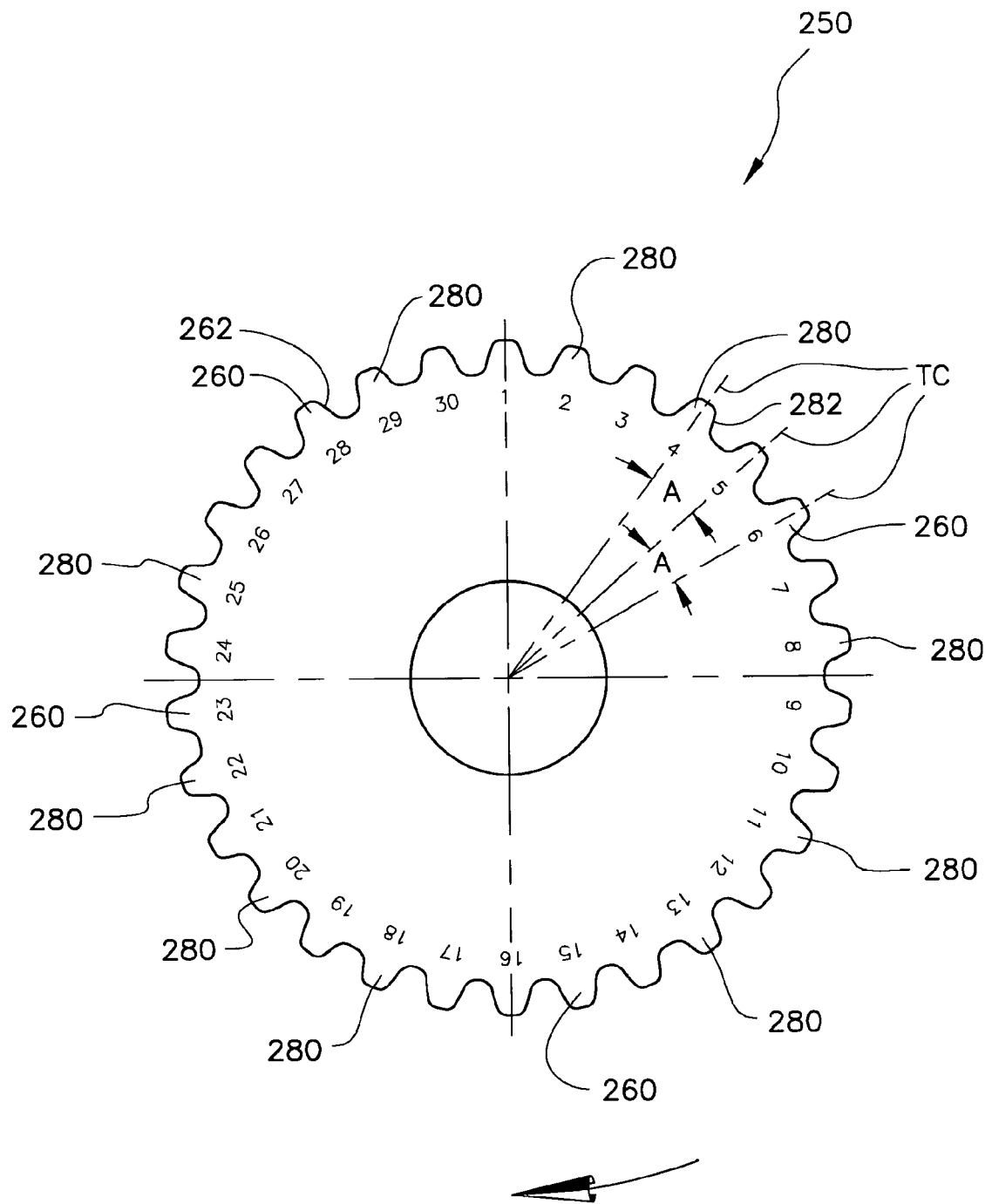
FIG. 8A is a front elevational view of the sprocket of FIG. 5A in its entirety, with the teeth numbered for reference herein.

Referring now to FIG. 8A, conventional teeth 260 and flank-relieved teeth 280 are arrayed around the sprocket 250 in a random or a specific pattern with the tooth centers/origins TC spaced evenly at 360/N degrees (where N is the total number of teeth) in order to optimize the meshing modulation for a particular engine chain drive, but other patterns and tooth combinations are within the scope of this invention including positioning two or more flank relieved teeth 280 next to each other and/or two or more conventional teeth 260 next to each other.

The meshing modulation for the sprocket 250 and a chain 210 is illustrated in FIG. 8B for a chain having a link pitch equal to a theoretical, or 7.7 mm pitch in this instance, and the 30-tooth drive sprocket 250. It can be seen that for the sprocket 250 shown in FIG. 8A, $\theta=13°$ as between successive standard teeth 260 (for "normal" initial contact frequency) and $\theta=11.75°$ as between a standard tooth 260 followed by a flank-relieved tooth 280 in the direction on rotation (for delayed initial contact). For the theoretical chain pitch $P_c$, $\theta=13°$ as between a flank-relieved tooth 280 followed by a standard tooth 260 (normal initial contact frequency) but, as just noted, under real-world conditions, an elongated chain pitch $P_c'$ in a chain 210' will result in $\theta>13°$ (for advanced initial contact) for additional modulation of the initial contact meshing frequency when at least one flank-relieved tooth 280 precedes a standard tooth 260. This can be seen with reference to FIG. 8C which illustrates meshing geometry utilizing a chain having 0.09% pitch elongation (a high limit as-manufactured chain), and meshing modulation is enhanced to include advancing the initial meshing contacts IC with a chain having elongated link pitch $P_c'$. In particular, FIG. 8C shows that for the same 30 tooth sprocket of FIG. 8B, $\theta=13°$ as between successive standard teeth 260, $\theta=11.75°$ as between a standard tooth 260 followed by a flank-relieved tooth 280 (for delayed initial contact), and $\theta=13.13°$ when a standard tooth 260 follows a flank-relieved tooth 280 (for advanced initial contact).

Figure 9A:
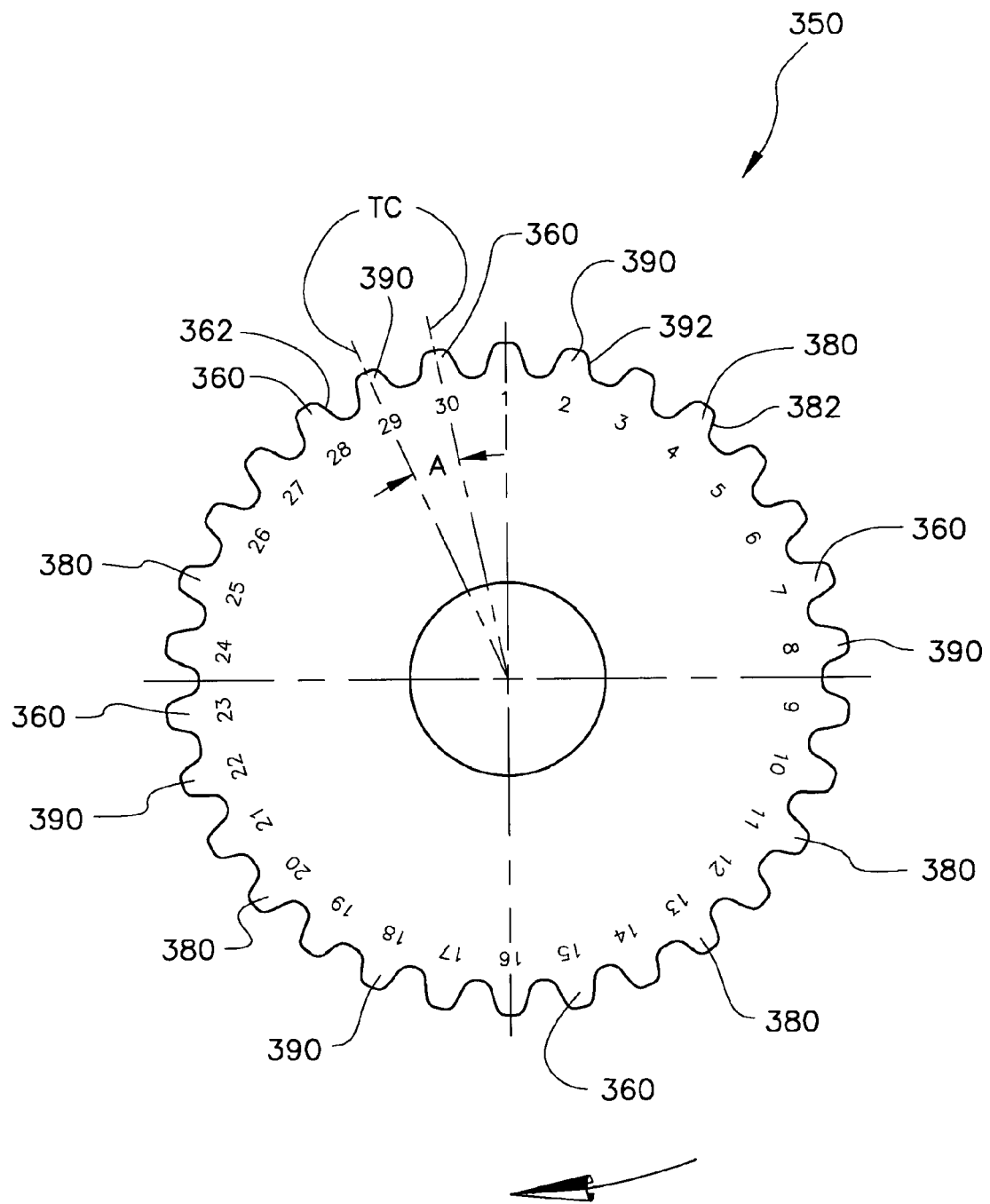
FIG. 9A is a front elevational view of a complete sprocket formed in accordance with another embodiment, with the teeth numbered for reference herein.

FIG. 9A shows a sprocket 350 formed in accordance with the present development that is identical to the sprocket 250 except as otherwise shown and/or described and, as such, like features of sprocket 350 relative to sprocket 250 are identified with reference numbers that are 100 greater than those used herein to describe the sprocket 250. The sprocket 350 comprises standard teeth 360, one or more first flank-relieved teeth 380 and also one or more second flank-relieved teeth 390. Each of the second flank relieved teeth comprises an engaging flank 392 defined with flank relief that is greater than that for engaging flank 382 of tooth 380. Tooth 390 has an engaging flank 392 that is offset relative to an engaging flank 262 of a standard tooth 260 to provide flank relief FR2 as shown in FIG. 9B. This flank relief FR2 is preferably in the range of 0.05-0.15 mm. Root surface 395 of flank-relieved tooth 390 is preferably identical to root surface 285 of flank-relieved tooth 280 and acts in the same fashion to maintain hard contact between a chain 210,210' and sprocket 350 forward of a flank-relieved tooth 390 and is inclined radially inwardly moving forward from tooth 390 to prevent camming action and lifting of the pin 240 located in front of tooth 390 when the leading toes 238 of a trailing link row move relative thereto as described above.

Figure 10A:
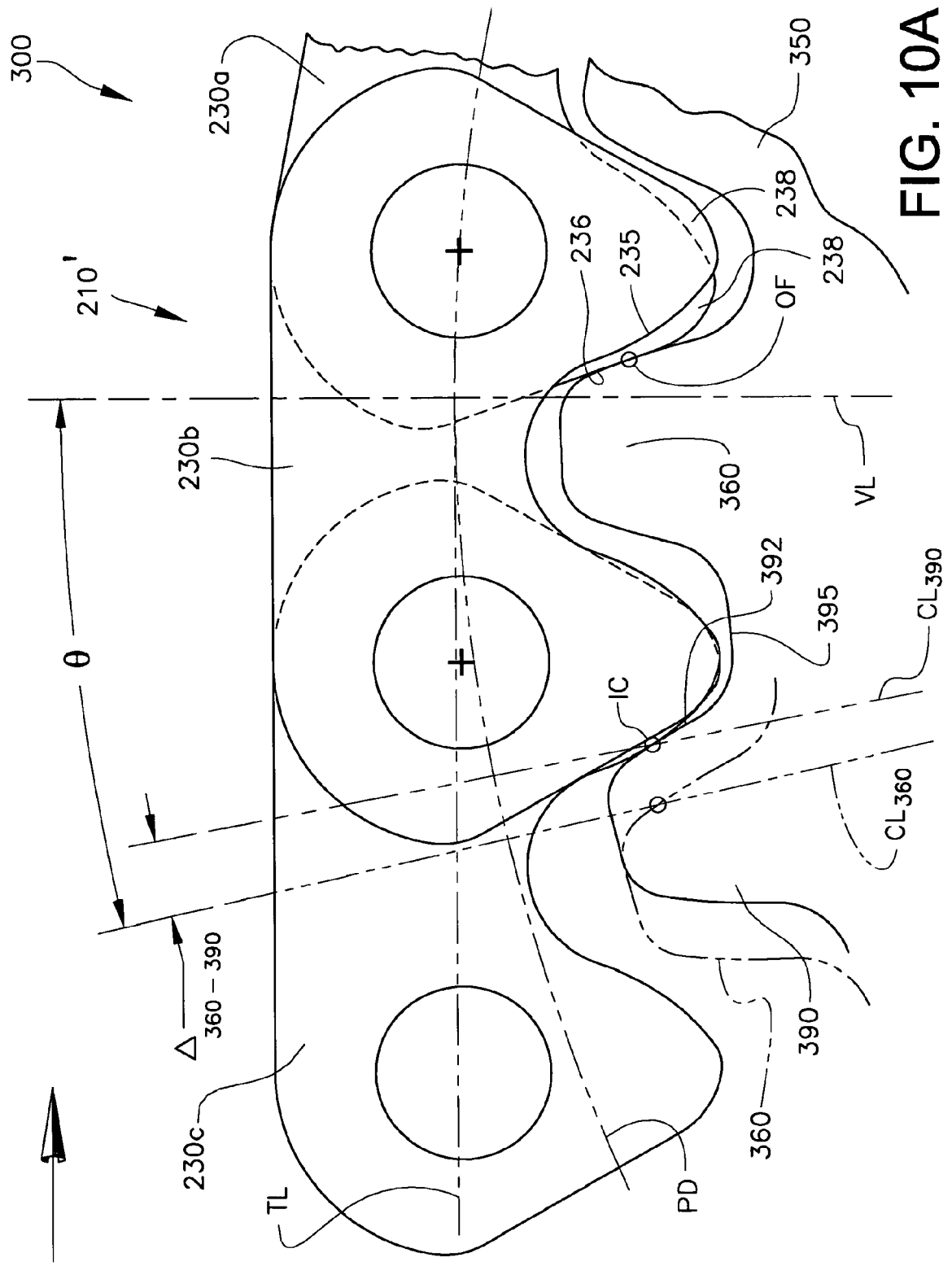
FIGS. 10A, 10B, 10C, and 10D are greatly enlarged views of a chain drive system having the sprocket of FIG. 9A, including multiple different flank-relieved teeth and conventional symmetrically formed teeth, and illustrates frequency modulated meshing of the chain with the sprocket according to the present invention.

FIGS. 10A through 10D progressively show engagement of a chain 210' with sprocket 350. Referring first to FIG. 10A, inside link plate row 230c is shown at the instant of initial meshing contact IC with engaging flank 392 of flank-relieved tooth 390 of the sprocket 350. The tooth preceding tooth 390 is a standard tooth 360. As shown, sprocket 350 must rotate further through an added angle, $\Delta_{360-390}$ before initial meshing contact IC occurs (reduction in the angle $\theta$) as compared to the initial contact angle $\theta$ defined when successive conventional teeth 360 are used as indicated by the trailing tooth 360 shown in phantom lines. The presence of a trailing flank-relieved tooth 390 delays the inside link plate row 230c meshing impact with tooth 390, thereby serving to further modulate the meshing frequency beyond that of tooth 380.

Figure 10B:
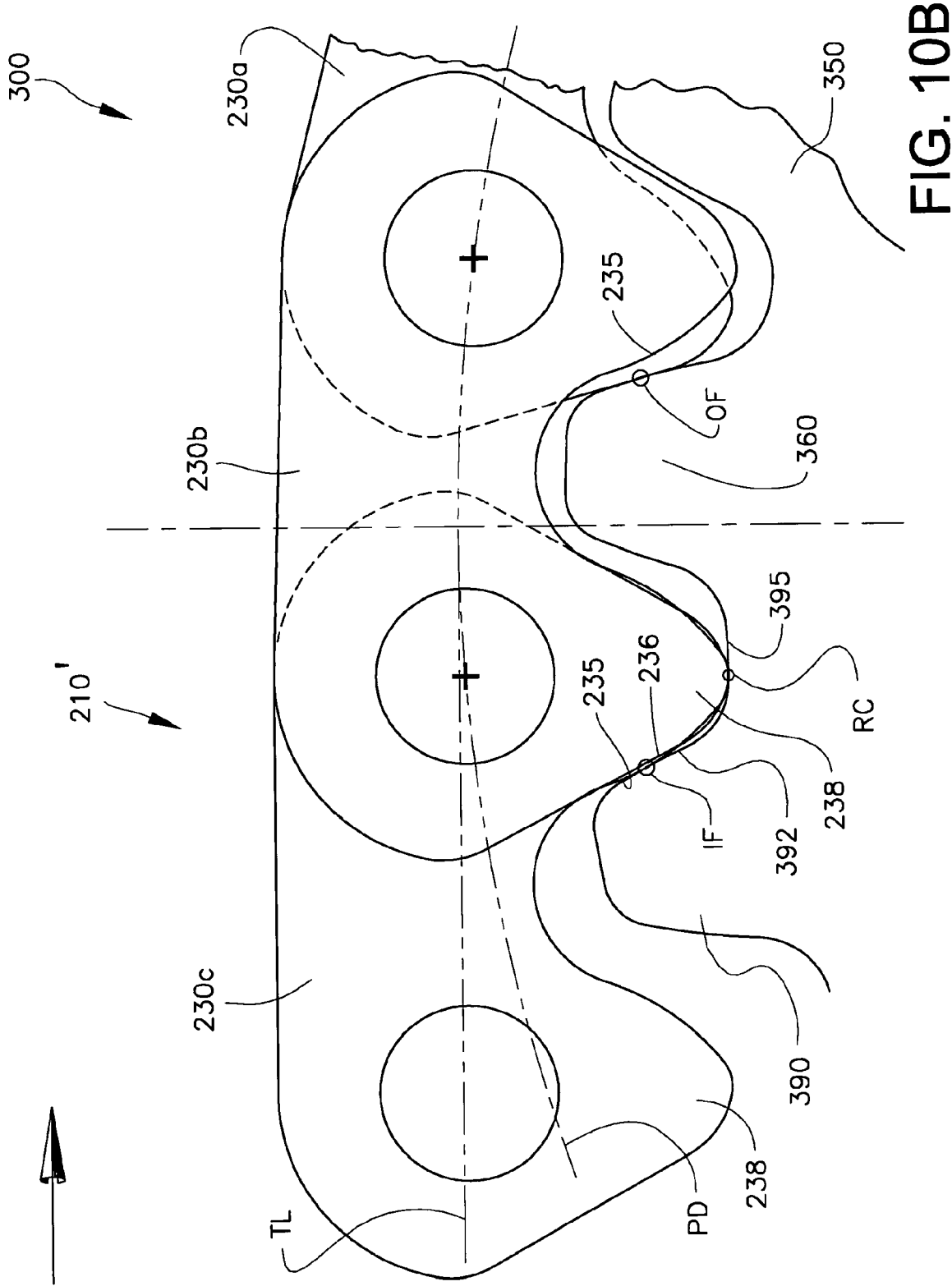

In FIG. 10B the sprocket 350 has been rotated forward to a position of transition contact for a flank-relieved tooth, where the trailing toes 238 of link row 230b contact root surface 395 at RC, and leading inside flanks 235 of link row 230c are still in contact at IF with flank 392 of tooth 390. Because the flank 392 is relieved as described, the trailing outside flanks 236 of link row 230b will not make transition contact with the flank 392. Instead, the transition occurs as shown when trailing toes 238 of row 230b contact root surface 395 at location RC before inside flanks 235 of link row 230c move out of contact with sprocket tooth flank 392.

Figure 10C:
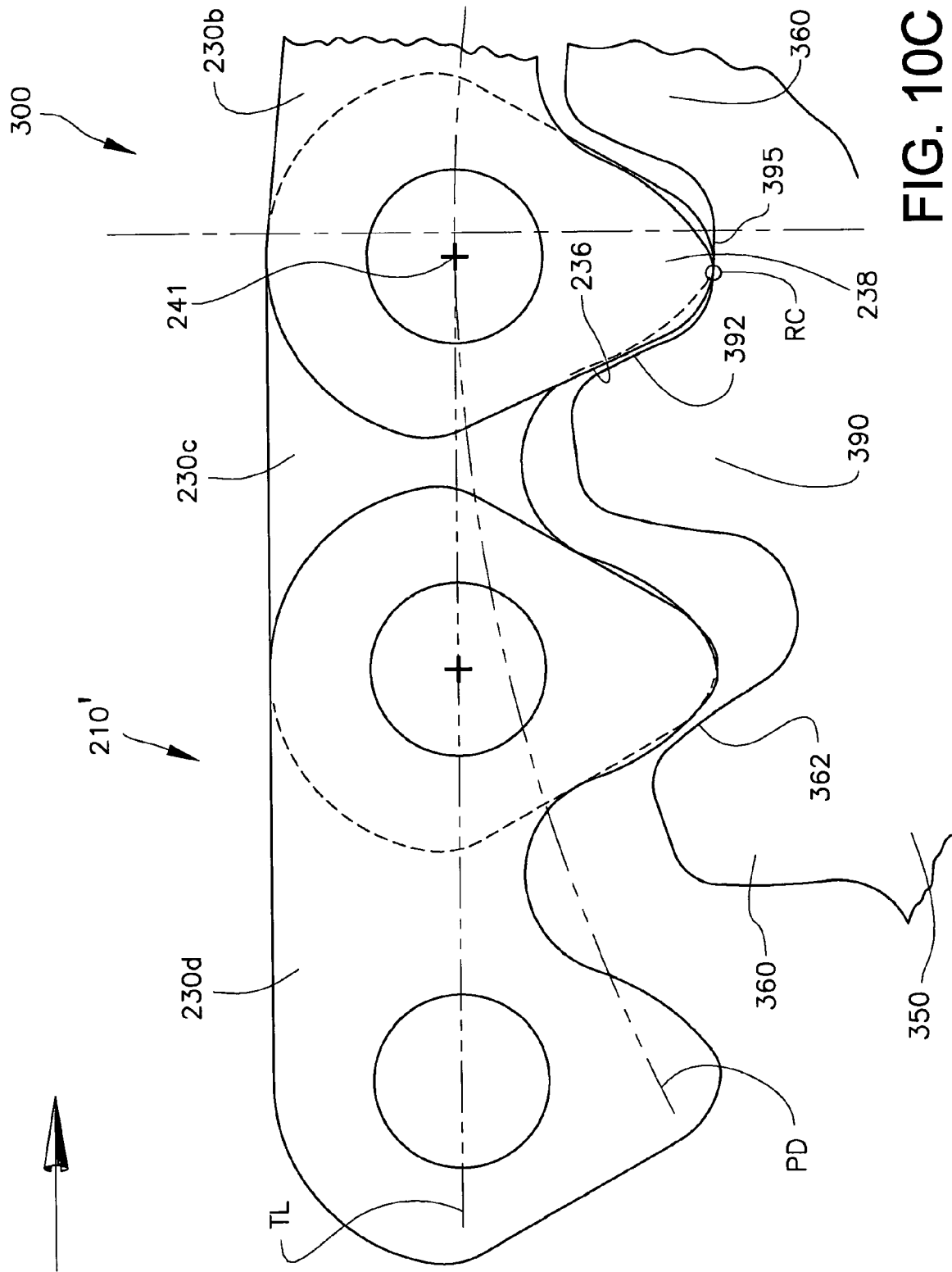

FIG. 10C shows the sprocket 350 rotated forward another increment so it can be seen that with link row 230b fully meshed with the sprocket, trailing outside flanks 236 thereof are spaced from relieved flank 392 and trailing toes 238 thereof maintain contact with root surface 395 at RC to maintain pin center 241 on the pitch diameter PD. Again, it is noted that inclined root surface 395 ensures that leading toes 238 of following link row 230c do not cam against root surface 395 as would lift pin center 241.

Figure 10D:
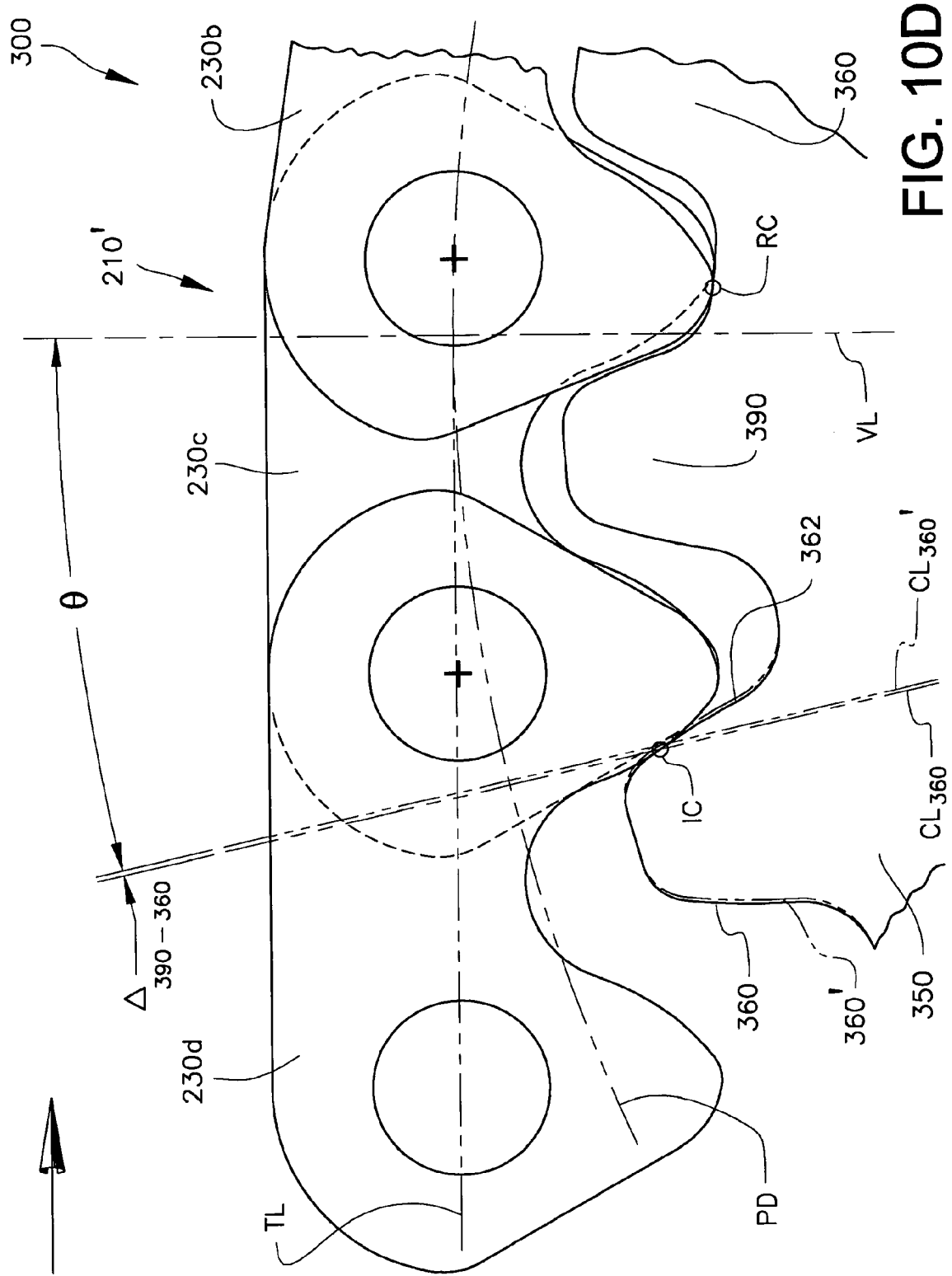

As shown in FIG. 10D, the meshing initial contact IC occurs earlier (increase in the angle $\theta$), thereby advancing the meshing by an amount, angle $\Delta_{390-360}$ when a flank-relieved tooth 390 precedes a standard tooth 360 (or a tooth 380) at the onset of meshing for a chain 210' having a link pitch $P_c'$ equal to a high limit as-manufactured chain, or 0.09% pitch elongation over theoretical pitch. The angle $\Delta_{390-360}$ is defined as the angle between the radial lines $CL_{360}$, and $CL_{360}$ where the line $CL_{360}$ passes through the center of sprocket 350 and the point of initial contact between tooth 360 and chain 310', and where the line $CL_{360'}$ passes through the center of the sprocket and the point where initial contact with tooth 360 would be made with chain 310' if not preceded by the flank-relieved tooth 390. Those of ordinary skill in the art will recognize that this advancement of the initial meshing contact (increase in the angle $\theta$ by an amount=$\Delta_{390-360}$) when a flank relieved tooth 390 precedes a standard tooth 260 (assuming a chain pitch $P_c'$ longer than $P_c$) is amplified further when two or more successive flank relieved teeth 280,390 precede a standard tooth 260, at least to a point where further increases in $\Delta_{390-360}$ are not possible due to contact between the chain 210' and the relieved flank 282,392 of a preceding tooth 280,390.

Teeth 360,380 and 390 can be arrayed around the sprocket 350 in a random or specific pattern in order to optimize the meshing modulation. One such pattern is illustrated graphically in FIG. 11 for a 30-tooth sprocket, but other patterns and tooth combinations are within the scope of this invention including positioning two flank relieved teeth next to each other. It is also within the scope of this invention to modify the sprocket tooth profile to include added pitch-mismatch in order to increase the meshing modulation angle with the meshing impact IC occurring sooner (advanced) when meshing with a standard tooth form is preceded by a flank-relieved tooth form. FIG. 11 shows that, for a chain 210' having a pitch $P_c'$ longer than the theoretical pitch $P_c$ the angle $\theta=13°$ for successive standard teeth 360, θ=11.10° for a standard tooth 360 followed by a flank-relieved tooth 390 (delayed initial contact), θ=11.75° for a standard tooth 360 followed by a flank-relieved tooth 380 (delayed initial contact), θ=13.13° for a single flank-relieved tooth 380,390 followed by a standard tooth 360 (advanced initial contact).

A sprocket formed in accordance with the present development can be cut from steel stock or can be defined using a powder metallurgy ("PM") process, many of which are well known in the art. Such PM processes utilize the steps of mixing of the alloy components, compacting the powder metal in a die, and sintering the compacted part. Because of the environment in which they operate and the stresses they are subjected to, sprockets for use in automotive applications have traditionally also required a heat treating or other hardening step subsequent to sintering, i.e., sprockets for such automotive applications must have physical properties (hardness, tensile and impact strength) higher than required by sprockets for less demanding applications and, thus, a separate heat treating operation is normally required for durability and wear considerations.

Conventional heat treating of PM components commonly involves heating the entire part to a temperature of approximately 1550° F. then quenching the parts rapidly in either oil, polymer/water mixture or nitrogen gas. Alternatively, some PM sprockets are induction heat treated. This involves heating the sprocket teeth to a depth of approximately 4 millimeters below the root of the tooth. The sprockets are then quenched rapidly in either oil, a polymer/water mixture, or air. Unfortunately, such hardening processes can negatively affect the tolerances achievable for such sprocket profiles due to dimensional change and distortion. The amount of distortion is related to the amount of heat used in such processes. In an attempt to minimize the amount of heat used, the induction heat treating process uses multiple induction frequencies to concentrate the approximate 1550° F. heat at the tooth surfaces, thereby reducing the total heat in the part. Although part distortion and dimensional change are minimized in this manner, they are still experienced.

Because the design features of the above-described random tooth sprocket that generate superior NVH properties are very small and the tolerances quite tight, it is important that the entire process is engineered for higher precision than conventional PM sprockets are capable using a sintering step and subsequent heat hardening. By using a sinter-hardening process as opposed to the above-described hardening processes, subsequent induction hardening or other hardening of the teeth after sintering is not required, which beneficially permits one to maintain better control for the required tooth profile feature tolerances, particularly with flank relief profiles. One suitable sinter-hardening process for use in the production of the above described sprockets may utilize an alloy having a specific composition as well as a sintering process using a certain atmosphere, temperature, and subsequent rapid cooling rate. A suitable alloy for use in the present sinter-hardening process includes the following, wherein percentages are weight percent: copper 1.5-2.2%; nickel 1.2%-1.6%; molybdenum 1.0-1.5%; graphite 0.7-1.0%; manganese 0.3-0.6%; lubricant 0.5%-0.8%; and the balance iron. The nickel, molybdenum, and manganese are prealloyed and introduced into the iron melt. The resulting alloy is then atomized to form an alloy powder. The remaining ingredients are then admixed in to form the powder blend to be used in the process. In addition, it is known in the PM industry that varying concentrations/non-homogeneous distribution of fine particle alloying elements such as nickel and graphite have an detrimental affect on dimensional change and variability. To reduce the loss of small nickel and graphite admixed alloying particles in the powder transfer system and to prevent segregation, a binder-treatment may be applied to the powder mixture. The binder treatment adheres small alloying particles to larger particles preventing loss due to dusting and concentrations of fine particles due to segregation.

The powder blend is then compacted in a tool or die using known compacting processes. In one embodiment, the temperature of the powder and/or tooling is between 250-280° F. After compaction, the resulting part is subjected to the present sinter-hardening process. This process comprises heating the part to a certain temperature under an appropriate atmosphere and then cooling the part at a prescribed cooling rate.

The sinter hardening process may be conducted in a conventional sintering furnace modified to allow the rapid cooling of the part that is necessary, as detailed below. The part is preferably sintered at a temperature between 2040-2100° F., depending on the composition of the part.

As previously noted, dimensional change and variation are known to be related to graphite content. Graphite is the source of carbon in the powder mixture that transforms iron to steel in the sintering furnace. Sintering must be performed in a controlled atmosphere to prevent the formation of oxides, avoid decarburization and remove oxides present on the powder particles. A preferable atmosphere in the sintering furnace in which to conduct the sintering is mixed high purity nitrogen and hydrogen (elemental gases) to achieve minimal dimensional variation. A suitable atmosphere may thus be, e.g., a 95%/5% blend of $N_2/H_2$.

Although less preferred, other atmospheres may include endothermic gas (generated by passing natural gas through a heated catalyst), disassociated ammonia (DA) (anhydrous ammonia disassociated by heating), and vacuum (absence of atmosphere, thereby absence of oxygen). Endothermic and DA inherently have more variation because the raw materials are relatively unpure. These unrefined product used to produce endothermic gas and DA contribute to excessive variation in percentage of oxygen and or carbon potential present in the sintering atmosphere, degrading sprocket dimensional characteristics. Additional variation can occur due to the condition of the equipment necessary to process the natural gas and anhydrous ammonia. The economics of vacuum sintering are poor because of the need for a separate operation to remove pressing lubricants from the work pieces to avoid contamination of vacuum pumps.

By using a raw material system containing combinations of molybdenum, nickel, copper, manganese and carbon the proposed process heat treats the entire part during a modified sintering cycle, termed sinter-hardening. The modified cycle increases the cooling rate at the critical temperature range of the cooling cycle. This avoids the reheating and rapid quenching necessary in conventional post-sintering hardening practices, thereby dimensional change, distortion and variation are minimized.

As mentioned above, the cooling of the part after sintering must take place at a rapid rate in order to affect a hardening of the metal part. A preferred rate is from 2.5-4.0° F./second. This rate of cooling can be accomplished using, e.g., water-cooled jackets surrounding the parts as they exit the high-heat region of the furnace or an efficient heat exchanger connected to the furnace. Such heat exchangers continuously exhaust the heated atmospheric gases in the oven, rapidly cool them, and cycle them back into the furnace. Other methods for rapid cooling may be possible as well.

The invention has been described with reference to preferred embodiments. Modifications and alterations will occur to those of ordinary skill in the art to which the invention pertains, and it is intended that the following claims be construed literally and/or according to the doctrine of equivalents as encompassing all such modifications and alterations to the fullest possible extent.

The invention claimed is:

1. An inverted tooth chain drive system comprising:

a sprocket supported for rotation about an axis of rotation and comprising a plurality of teeth defined relative to respective tooth centers, said tooth centers spaced evenly in a circumferential arrangement about said axis of rotation, each of said plurality of teeth comprising an engaging flank, wherein at least some of said teeth are standard teeth and other ones of said teeth are flank-relieved teeth, said engaging flanks of said flank-relieved teeth being negatively offset relative to their respective tooth centers as compared to said engaging flanks of said standard teeth relative to their respective tooth centers, said plurality of teeth separated from each other by respective root surfaces, with the respective root surface adjacent and leading the engaging flank of each flank-relieved tooth in terms of a direction of rotation of said sprocket being a raised root surface that is located radially outward as compared to the respective root surface adjacent and leading each standard tooth in terms of said direction of rotation of said sprocket;

an inside flank engagement inverted tooth chain engaged with the sprocket and comprising a plurality of rows of links each structured for inside flank engagement with the sprocket, with leading inside flanks of each row projecting outwardly relative to the trailing outside flanks of a preceding row;

wherein initial meshing engagement between said chain and one of said standard teeth or one of said flank-relieved teeth includes initial contact between the tooth engaging flank and the leading inside flanks of a meshing chain row;

wherein, upon said inverted tooth chain fully meshing with one of said standard teeth, said trailing outside flanks of said chain contact the engaging flank of the standard tooth and toes of said chain are spaced from said root surface adjacent and leading said standard tooth; and, wherein, upon said inverted tooth chain fully meshing with one of said flank-relieved teeth, said trailing outside flanks of said chain are spaced from the engaging flank of the flank-relieved tooth and the toes of said chain are in root contact with said raised root surface adjacent and leading said flank-relieved tooth.

2. The inverted tooth chain drive system as set forth in claim 1, wherein each of said raised root surfaces slopes inwardly toward said axis of rotation as said raised root surface extends forwardly away from said engaging flank of said flank-relieved tooth toward a leading sprocket tooth.

3. The inverted tooth chain drive system as set forth in claim 1, wherein said inverted tooth chain defines a chain pitch that is greater than a theoretical minimum chain pitch required for said chain to wrap said sprocket.

4. The inverted tooth chain drive system as set forth in claim 1, wherein each of said flank-relieved teeth is defined with one of at least two different flank-relieved tooth profiles, wherein said at least two different flank-relieved tooth profiles are defined with said engaging flanks thereof negatively offset a different amount as compared to each other and the engaging flanks of said standard teeth.

5. A sprocket adapted to mesh with an inside flank engagement inverted tooth chain, said sprocket comprising:

a plurality of teeth defined relative to respective tooth centers, wherein the tooth centers are spaced evenly in a circumferential arrangement about an axis of rotation, each of said plurality of teeth comprising an engaging flank, wherein at least some of said teeth are standard teeth and other ones of said teeth are flank-relieved teeth, said engaging flanks of said flank-relieved teeth being negatively offset relative to their respective tooth centers as compared to said engaging flanks of said standard teeth, said plurality of teeth separated from each other by respective root surfaces, with the respective root surface adjacent and leading the engaging flank of each flank-relieved tooth being a raised root surface that is located radially outward as compared to the respective root surface adjacent and leading each standard tooth;

wherein each of said raised root surfaces slopes inwardly toward said axis of rotation as said raised root surface extends forwardly away from said engaging flank of said flank-relieved tooth toward a leading sprocket tooth.

6. The sprocket as set forth in claim 5, wherein each of said flank-relieved teeth is defined with one of at least two different flank-relieved tooth profiles, wherein said at least two different flank-relieved tooth profiles are defined with said engaging flanks thereof negatively offset relative to their respective tooth centers by a different amount as compared to each other and as compared to said engaging flanks of said standard teeth.

* * * * *